US011742668B2

(12) United States Patent
Bangalore et al.

(10) Patent No.: US 11,742,668 B2
(45) Date of Patent: Aug. 29, 2023

(54) METHODS AND SYSTEMS FOR GREEN ENERGY CHARGING OF ELECTRICAL VEHICLES

(71) Applicant: Hygge Energy Inc., Cupertino, CA (US)

(72) Inventors: Sundara Raju Giridhar Bangalore, Mumbai (IN); Rajagopalan Krishnamurthy, Cupertino, CA (US)

(73) Assignee: Hygge Energy Inc., Cupertino, CA (US)

( * ) Notice: Subject to any disclaimer, the term of this patent is extended or adjusted under 35 U.S.C. 154(b) by 195 days.

(21) Appl. No.: 17/085,414

(22) Filed: Oct. 30, 2020

(65) Prior Publication Data

US 2022/0140610 A1 May 5, 2022

(51) Int. Cl.
*H02J 3/38* (2006.01)
*B60L 53/80* (2019.01)
(Continued)

(52) U.S. Cl.
CPC ............. *H02J 3/381* (2013.01); *B60L 53/51* (2019.02); *B60L 53/53* (2019.02); *B60L 53/64* (2019.02); *B60L 53/665* (2019.02); *B60L 53/80* (2019.02); *B60L 55/00* (2019.02); *B60L 58/12* (2019.02); *H02J 3/322* (2020.01); *H04L 67/12* (2013.01); *B60L 2240/72* (2013.01);
(Continued)

(58) Field of Classification Search
None
See application file for complete search history.

(56) References Cited

U.S. PATENT DOCUMENTS 9,020,649 B2  4/2015 Sharma et al.
9,692,234 B2  6/2017 Mammoli et al.
(Continued)

FOREIGN PATENT DOCUMENTS

WO   WO-2012134495 A1 * 10/2012   ............ B60L 11/184
WO   WO-2018156732 A1 *  8/2018   .............. B60L 50/50

OTHER PUBLICATIONS

S. Chakraborty and M. G. Simoes, "PV-Microgrid Operational Cost Minimization by Neural Forecasting and Heuristic Optimization," 2008 IEEE Industry Applications Society Annual Meeting, 2008, pp. 1-8, doi: 10.1109/08IAS.2008.147.

*Primary Examiner* — David V Henze-Gongola
(74) *Attorney, Agent, or Firm* — Stratford Group Ltd.

(57) ABSTRACT

A microgrid system that supports EV charging. The microgrid system powers the load with one or more renewable energy sources (for example, solar, wind), battery storage, in combination with optional access to limited utility power and automatically-controlled generator power as a backup. The system can deliver clean uninterrupted power. The system provides flexibility to support the export of power for net metering, gross metering or peer-peer trading, as permitted by local regulations. The system includes a main storage sub-system and an optional secondary storage that may be brought online and increased or decreased as needed, and optimized based on guidance provided by the microgrid controller. The system also includes modules that decide how to optimally use the energy from the various sources, in order to maximize renewable energy usage, minimize the cost of electricity, while maximizing the life of the system.

23 Claims, 22 Drawing Sheets

(51) Int. Cl.
*B60L 55/00* (2019.01)
*B60L 53/66* (2019.01)
*B60L 53/51* (2019.01)
*B60L 53/53* (2019.01)
*B60L 58/12* (2019.01)
*H04L 67/12* (2022.01)
*H02J 3/32* (2006.01)
*B60L 53/64* (2019.01)

(52) U.S. Cl.
CPC ....... *B60L 2240/80* (2013.01); *B60L 2260/54* (2013.01); *H02J 2300/22* (2020.01)

(56) References Cited

U.S. PATENT DOCUMENTS

| | | |
|---|---|---|
| 10,079,317 B2 | 9/2018 | Gonatas |
| 2013/0042542 A1* | 2/2013 | Welschholz ............ B60L 53/30 52/173.3 |
| 2014/0336965 A1* | 11/2014 | Mori .................... H02J 7/0013 702/63 |
| 2018/0001776 A1* | 1/2018 | Kim ........................ B60L 53/65 |
| 2018/0054070 A1 | 2/2018 | Krishnamoorthy et al. |
| 2018/0097126 A1 | 5/2018 | Gonatas |
| 2018/0201142 A1 | 7/2018 | Galin et al. |
| 2019/0079473 A1 | 3/2019 | Kumar et al. |

* cited by examiner

Solar PV power generation

Weather conditions   Summer

PV capacity   12.75   kW
Efficiency factor   1

| Time | Summer | Autumn | Monsoon | winter | Solar PV generation |
|---|---|---|---|---|---|
| 0 | 0 | 0% | 0% | 0% | 0.00 |
| 1 | 0 | 0% | 0% | 0% | 0.00 |
| 2 | 0 | 0% | 0% | 0% | 0.00 |
| 3 | 0 | 0% | 0% | 0% | 0.00 |
| 4 | 0 | 0% | 0% | 0% | 0.00 |
| 5 | 0 | 0% | 0% | 0% | 0.00 |
| 6 | 5% | 3% | 2% | 5% | 0.64 |
| 7 | 20% | 10% | 7% | 18% | 2.55 |
| 8 | 25% | 13% | 8% | 23% | 3.19 |
| 9 | 90% | 45% | 30% | 81% | 11.48 |
| 10 | 100% | 50% | 33% | 90% | 12.75 |
| 11 | 100% | 50% | 33% | 90% | 12.75 |
| 12 | 100% | 50% | 33% | 90% | 12.75 |
| 13 | 100% | 50% | 33% | 90% | 12.75 |
| 14 | 90% | 45% | 30% | 81% | 11.48 |
| 15 | 30% | 15% | 10% | 27% | 3.83 |
| 16 | 10% | 5% | 3% | 9% | 1.28 |
| 17 | 0% | 0% | 0% | 0% | 0.00 |
| 18 | 0% | 0% | 0% | 0% | 0.00 |
| 19 | 0% | 0% | 0% | 0% | 0.00 |
| 20 | 0% | 0% | 0% | 0% | 0.00 |
| 21 | 0% | 0% | 0% | 0% | 0.00 |
| 22 | 0% | 0% | 0% | 0% | 0.00 |
| 23 | 0% | 0% | 0% | 0% | 0.00 |
| 24 | 0% | 0% | 0% | 0% | 0.00 |

METHODS AND SYSTEMS FOR GREEN ENERGY CHARGING OF ELECTRICAL VEHICLES

BACKGROUND

Growth in electrical vehicles in markets will drive an increase in the electrical grid demand. Limited grid infrastructure and generation resources call for alternate methods to sustainably support this increase in electrical vehicle (EV) charging capacity.

In addition, individual sites that have access to utility power, have a limit on the sanctioned power they can draw from a grid. The additional load of EV charging can more than double or triple the normal consumption of such individual sites. This necessitates a substantial upgrade in the connection to the grid; such upgrades are time-consuming and expensive.

Individual site owners and governments recognize the environmental and economic benefit of renewable energy sources to power their sites and in particular for addressing the additional load of EV charging. However, incentives that make it possible to adopt renewable energy resources such as net-metering support, are not available or not sufficient in many countries and states.

Distributed electricity generation resources can be utilized in a microgrid to support EV charging. However, the commercial viability of such a system is challenged by several factors. For example, there is the uncertainty in the adoption rate of EV charging as a business. This makes the timeline for return on investment unknown. Second, traditional microgrid solutions do not have an attractive payback period and often have lifetimes just barely long enough to cover the payback period.

BRIEF SUMMARY

In one aspect, there is provided a microgrid system comprising a microgrid controller; the microgrid controller having a plurality of input energy sources, the input energy sources selected from at least a grid source; a generator source; a battery and one or more renewable energy sources; the microgrid controller having as output: the battery, a site load and an electric vehicle (EV) charging service; wherein at least one of the site load and EV charging service are powered by a blend of the renewable energy source, the battery, the grid and the generator.

In some embodiments, excess power provided by at least one of the grid source; the generator source; and the one or more renewable energy sources is used to charge the battery.

In some embodiments, the microgrid controller directs the one or more renewable energy sources for EV charging while continuing to power the site load uninterrupted.

In some embodiments, the battery powers at least one of the site load and the EV charging service if a state of charge of the battery is above a cyclic low threshold.

In some embodiments, the microgrid further comprises a database storing: one or more source data structures, each source data structure associated with a respective input energy source, each data structure comprising information about the respective input energy source, the information comprising: one or time intervals during which the respective input energy source provides energy to the battery; and an amount of power provided by the respective input energy source to the battery during each time interval; and a blend ratio buffer, the blend ratio buffer comprising: a state of charge of the battery and a split factor of each input energy source during each time interval. A billing module can be used to determine billing for an episode of charging an electrical vehicle, the billing module based on: billing information for each input energy source; a direct contribution of each input energy source towards the episode; a blended contribution of each input energy source towards the episode, the blended contribution based on the blend ratio buffer; and one or more parameters of the battery. The billing can be determined after the episode is complete, or the billing may be continually evaluated during the episode.

In some embodiments, a second battery is connected as output and input to the microgrid controller, and the second battery is detachable from the microgrid system. The second battery may be embedded as a main battery in an electric vehicle. The second battery can be empty, partially charged or fully charged when connected to the microgrid. The second battery may not be used by the microgrid to charge the battery or the electric vehicle.

In some embodiments, the microgrid system further comprises a secondary storage guidance module for predicting one or more second battery specifics selected from at least one of: how many times a day to use the second battery; a time of day when to use the second battery; and a storage capacity of the second battery; the secondary storage guidance module using as input at least one of: an EV predictor module; a solar predictor module; and a system behaviour module. The EV predictor module can provides a prediction, for a given day, of at least one of: one or more EV occurrences and EV power requirements for each occurrence; the solar predictor module can provide a prediction for the given day, of solar illumination; and the system behaviour module can provide a prediction, for the given day, of at least one of: one or more energy shortfalls; power consumption of the site; and occurrences of a change of the input energy sources occurs. At least one of the EV predictor module, the solar predictor module and the system behaviour module can be a machine-learning based module.

In some embodiments, the microgrid system further comprises a dynamic storage optimization module for optimizing storage; the dynamic storage optimization module using as input at least one of: an EV predictor module; a solar predictor module; a behaviour module; and a cost function module. The EV predictor module can provide a prediction, for a given day, of at least one of: one or more EV occurrences and EV power requirements for each occurrence; the solar predictor module can provide a prediction for the given day, of solar illumination; and the system behaviour module can provide a prediction, for the given day, of at least one of: one or more energy shortfalls; power consumption of the site; and occurrences of a change of the input energy sources occurs; and the cost function module provides information about at least one of: time-based electricity rates; selling rates for each of the input energy sources; storage rates for each of the input energy sources; and retrieval rates for each of the input energy sources. 16. At least one of the EV predictor module, the solar predictor module and the system behaviour module may be a machine-learning based module.

In another aspect, there is provided a method of powering at least one of a site load and an electric vehicle (EV) charging service, the method comprising: providing as input to a microgrid controller of a microgrid, a plurality of input energy sources selected from at least a grid source; a generator source; a battery and one or more renewable energy sources; providing as output by the microgrid controller: the battery, the site load and the EV charging service; wherein at least one of the site load and EV charging service are powered by a blend of the renewable energy source, the battery, the grid and the generator.

In some embodiments, the method further comprises storing in a database: one or more source data structures, each source data structure associated with a respective input energy source, each data structure comprising information about the respective input energy source, the information comprising: one or time intervals during which the respective input energy source provides energy to the battery; and an amount of power provided by the respective input energy source to the battery during each time interval; and a blend ratio buffer, the blend ratio buffer comprising: a state of charge of the battery and a split factor of each input energy source during each time interval. A billing module can be used to determine billing for an episode of charging an electrical vehicle, the billing module based on: billing information for each input energy source; a direct contribution of each input energy source towards the episode; a blended contribution of each input energy source towards the episode, the blended contribution based on the blend ratio buffer; and one or more parameters of the battery. The billing can be determined after the episode is complete, or the billing may be continually evaluated during the episode.

In some embodiments, the method further comprises: providing a second battery as input and output to the microgrid controller; and predicting, by a secondary storage guidance module, one or more second battery specifics selected from at least one of: how many times a day to use the second battery; a time of day when to use the second battery; and a storage capacity of the second battery; the secondary storage guidance module using as input at least one of: an EV predictor module; a solar predictor module; and a system behaviour module. The EV predictor module can provides a prediction, for a given day, of at least one of: one or more EV occurrences and EV power requirements for each occurrence; the solar predictor module can provide a prediction for the given day, of solar illumination; and the system behaviour module can provide a prediction, for the given day, of at least one of: one or more energy shortfalls; power consumption of the site; and occurrences of a change of the input energy sources occurs. At least one of the EV predictor module, the solar predictor module and the system behaviour module can be a machine-learning based module.

In some embodiments, the second battery may be embedded as a main battery in an electric vehicle. The second battery can be empty, partially charged or fully charged when connected to the microgrid. The second battery may not be used by the microgrid to charge the battery or the electric vehicle.

In some embodiments, the method further comprises: providing a second battery as input and input to the microgrid controller; and optimizing storage, by a dynamic storage optimization module; the dynamic storage optimization module using as input at least one of: an EV predictor module; a solar predictor module; a behaviour module; and a cost function module. The EV predictor module can provide a prediction, for a given day, of at least one of: one or more EV occurrences and EV power requirements for each occurrence; the solar predictor module can provide a prediction for the given day, of solar illumination; and the system behaviour module can provide a prediction, for the given day, of at least one of: one or more energy shortfalls; power consumption of the site; and occurrences of a change of the input energy sources occurs; and the cost function module provides information about at least one of: time-based electricity rates; selling rates for each of the input energy sources; storage rates for each of the input energy sources; and retrieval rates for each of the input energy sources. 16. At least one of the EV predictor module, the solar predictor module and the system behaviour module may be a machine-learning based module.

Disclosed is a microgrid system to support EV charging without updating a government-sanctioned load or utility transformer. The microgrid system powers the load with one or more renewable energy sources (for example, solar, wind), battery storage, in combination with optional access to limited utility power and automatically-controlled generator power as a backup. It provides savings—even when EV charging is not used. Furthermore, the microgrid system can deliver clean uninterrupted power. The microgrid system disclosed herein also includes metering and billing support to ensure that all regulatory compliances can be maintained and that full transparency of charges can be achieved. In some embodiments, the microgrid system provides flexibility to support the export of power for net metering, gross metering or peer-peer trading, as permitted by local regulations.

The system comprises a microgrid that powers the load using a combination of several sources of power, including renewable, grid and dispatchable backup such as a diesel generator. The microgrid includes a main storage subsystem and an optional secondary storage that may be brought online and increased or decreased as needed, and optimized based on guidance provided by the microgrid controller.

The system also includes modules that decide how to optimally use the energy from the various sources, in order to maximize renewable energy usage, minimize the cost of electricity, while maximizing the life of the system.

Disclosed are systems and methods for metering and measuring self-generated energy that is derived from a renewable energy source or a generator. In some embodiments, one or more components of stored energy that are derived from self-generated energy are metered and measured. A blended charge based on all sources of energy used to provide EV charging, is calculated. An EV charging microgrid may be isolated from grid consumption. In some embodiments, there are systems and methods for separately measuring and billing charging based on self-generated and grid-sourced energy at the same site. Parameter election for measurement can be provided to enable the aforementioned embodiments.

The system can measure and meter the power flow from its various sources and can cumulate the energy from each such source that is delivered to the loads (including the EV charger) or stored into the primary and secondary battery storage elements. By knowing this information, the system can enable any billing scheme or regulatory compliance requirements.

The system may be used to power a combination of loads that include the EV charging load and any additional site loads. In such a case, the system can direct the renewable energy to be delivered to an EV charger while diverting other sources to the additional loads so that EV charging may be performed using renewable energy and stored energy.

By being able to direct the renewable and stored energy towards additional loads when not engaged in EV charging, the system provides active payback—even when EV charging is infrequent in the market. The system thus minimizes the economic risk in deploying an EV charging infrastructure in sites where it is not clear when EV charging will be common enough to justify the deployment of such an infrastructure.

The system does not rely on any ability to export power to a utility grid. However, when such a feature is supported by local regulations, the system may do so. The system can also selectively limit the export of renewable energy to times where it is most economically valuable to export energy. In its general form, the system can adaptively optimize the use of this feature to maximize the economic value to the owner.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 19 illustrates solar illumination values in accordance with one embodiment.

DETAILED DESCRIPTION

Figure 1:
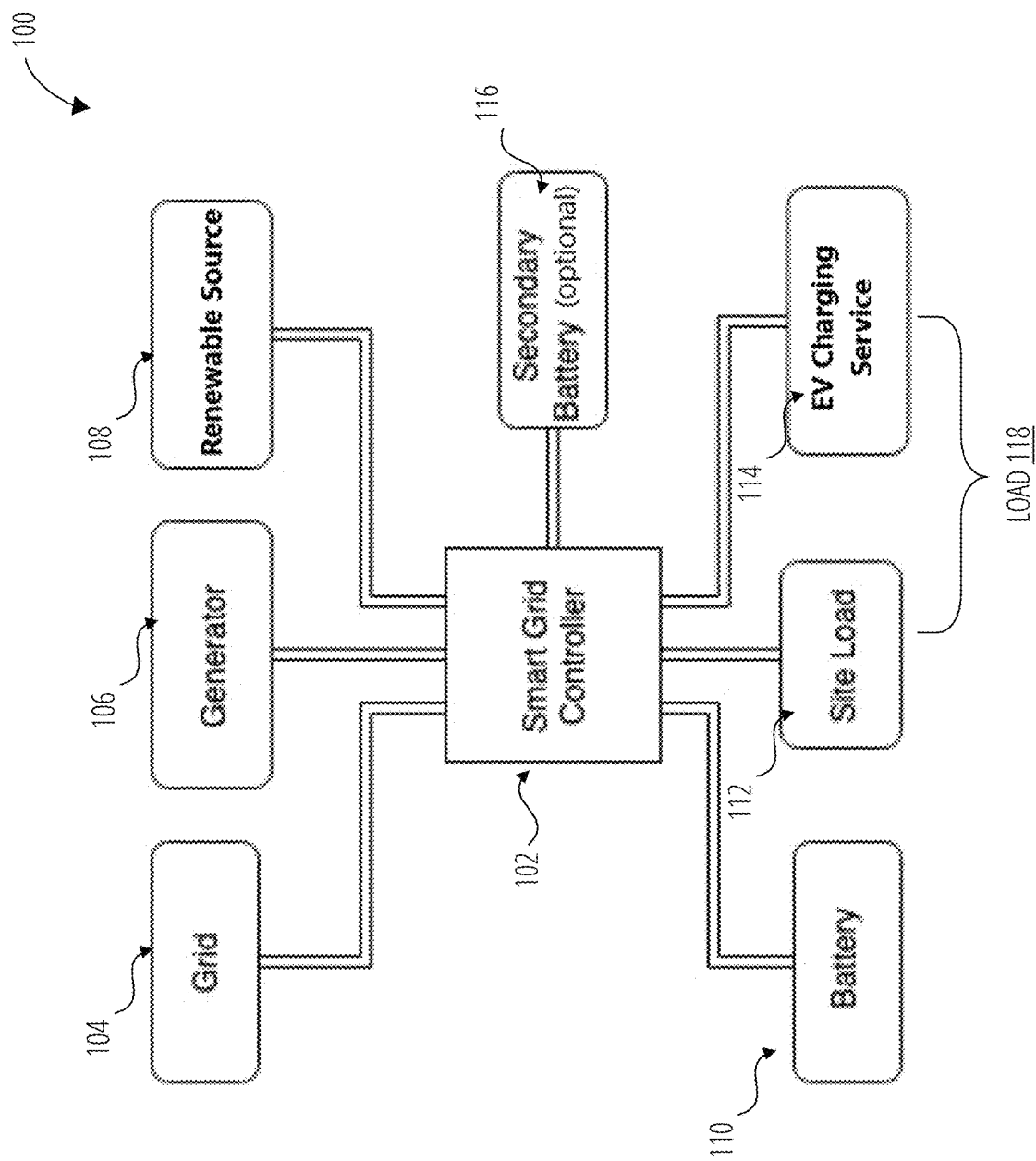
FIG. 1 illustrates a microgrid configuration in accordance with one embodiment.

FIG. 1 illustrates a microgrid configuration 100 in accordance with one embodiment. FIG. 1 shows a sample microgrid configuration using distributed sources (grid 104, generator 106 and renewable source 108), a smart grid controller 102, a battery 110, a site load 112, an EV charging service 114 and an optional secondary battery 116. The battery 110 represents a main storage resource.

In FIG. 1, battery 110 is the main storage resource for the renewable source 108. Battery 110 can be any type of battery, such as lead acid including VRLA, lithium ion, nickel or other chemistries. Battery 110 can also be non-electrochemical storage, such as ultra or super capacitor-based; or can be electromechanical storage, such as a flywheel.

An optional secondary battery 116, connected to the smart grid controller 102, represents a removable battery source such as a battery-swapping battery or a battery embedded in an electric vehicle. Secondary battery 116 may also be of any kind; in some embodiments, secondary battery 116 is a lithium battery used in EV battery swapping.

The smart grid controller 102 can include an automatic transfer switch (ATS). The Smart Grid controller 102 can be programmed to prioritize renewable sources and can include filters for processing and power measurements. Renewable source 108 can include solar, wind, hydro and other renewable sources of energy that can be accessed by smart grid controller 102. In some embodiments, the renewable source 108 comprises solar panels with a photovoltaic inverter.

Site load 112 can be any appliance that consumes electrical power (air conditioning, lights, heating, computer infrastructure, etc.). The site load 112 is distinct from a load 118 that is powered by smart grid controller 102, wherein the load 118 is the sum of the site load 112 and any entity that uses EV charging service 114. The EV charging service 114 can either be an AC-type or a DC-type. The difference between AC charging and DC charging in an EV is the location where the AC power gets converted; For AC charging, the AC power is converted externally to the EV. Unlike AC chargers, a DC charger has the converter inside the charger itself—which means that the DC charger can feed power directly to the car's battery; it doesn't need an onboard charger to for conversion. Hence DC chargers can charge an EV faster than AC chargers.

An example of an AC-type EV charging service 114 includes Delta™ AC Mini Plus EV Charger, which has a type 2 plug 7.36 kW or Type 2 socket 3.68 kW; up to 32 A@230 V charging. An example of a DC-type EV charging service 114 includes a Delta™ DC Wallbox EV Charger, which has CCS Combo 2/CHAdeMO dual charging ports; a maximum output power of 25 kW; an output voltage range of 50-500 Vdc (Combo) or 50-500 Vdc (CHAdeMO); and a maximum 92% power efficiency.

Figure 2:
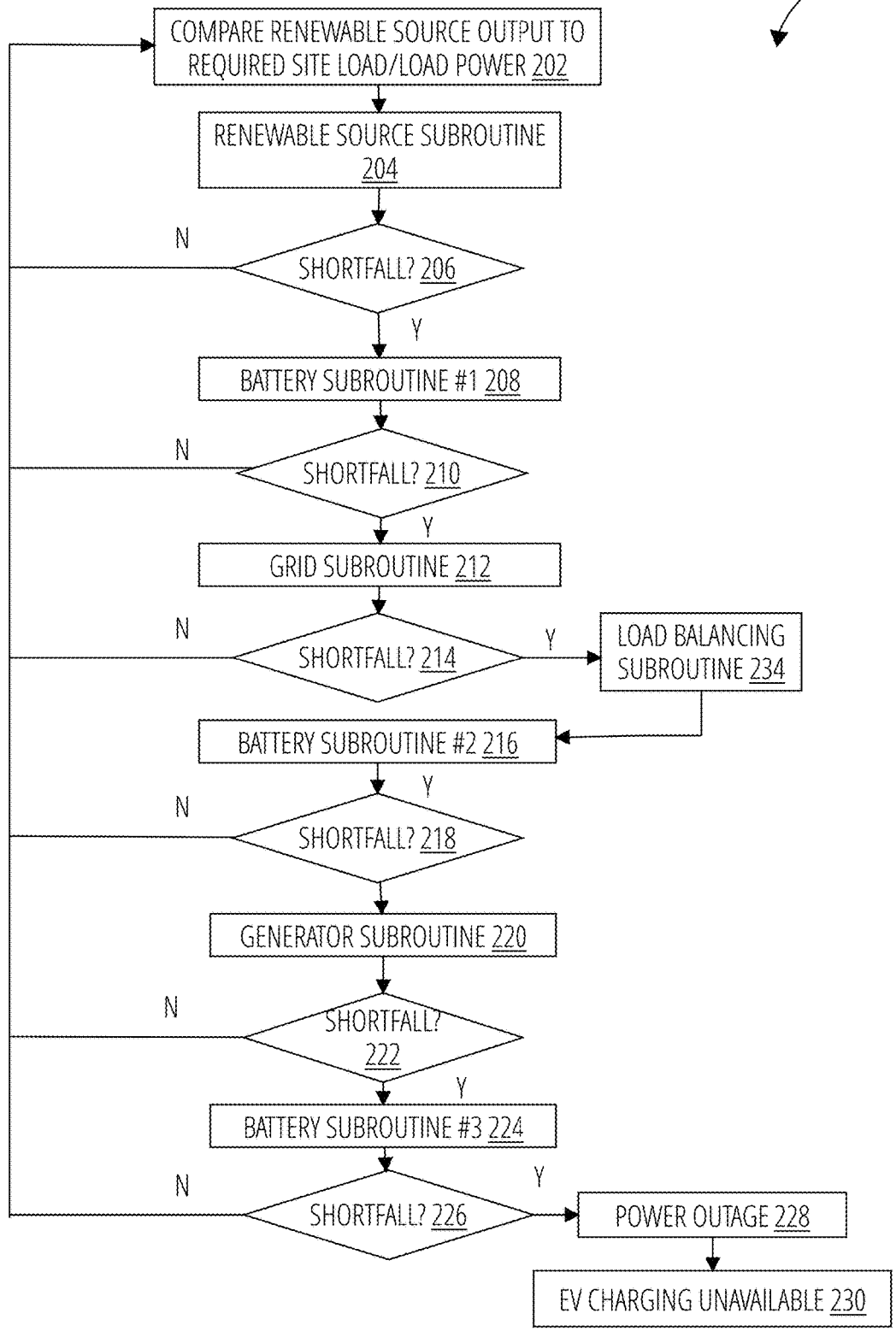
FIG. 2 illustrates a flowchart for microgrid controller logic in accordance with one embodiment.

In some embodiments, the renewable energy renewable source 108 can be directed to site load 112 or EV charging service 114. This enables an ensured payback on investment during the initial days when EV charging is not common. In this case, when EV charging service 114 is connected to the micro grid, site load 112 can be powered through a different path, directly through the grid 104, and in some cases, using an uninterrupted power supply FIG. 2 illustrates a flowchart for microgrid controller logic 200 of microgrid controller logic 232 in accordance with one embodiment. The flowchart for microgrid controller logic 200 shows an example of microgrid controller logic 232 that can be utilized in a configuration shown in FIG. 1, where three sources (grid 104, generator 106 and renewable source 108) are available to power the site load 112 or load 118, charge the battery 110 and provide EV charging service 114.

At step 202, the microgrid controller logic 232 compares the output of the renewable source 108 to the power required by the site load 112 or load 118. The microgrid controller logic 232 then proceeds to renewable source subroutine 204, after which it checks to see if there is a shortfall in filling the power requirement at decision block 206.

If there is no shortfall, the process returns to the beginning at step 202. If, on the other hand, there is a shortfall at decision block 206, the microgrid controller logic 232 proceeds to battery subroutine #1 208 to fill the shortfall, after which it checks to see if there is still a shortfall at decision block 210.

If there is no shortfall, the process returns to the beginning at step 202. If, on the other hand, there is a shortfall at decision block 210, the microgrid controller logic 232 proceeds to grid subroutine 212 to fill the shortfall, after which it checks to see if there is still a shortfall at decision block 214.

If there is no shortfall, the process returns to the beginning at step 202. If, on the other hand, there is a shortfall at decision block 214, the microgrid controller logic 232 proceeds first to load balancing subroutine 234 and then to battery subroutine #2 216 to fill the shortfall, after which it checks to see if there is still a shortfall at decision block 218.

If there is no shortfall, the process returns to the beginning at step 202. If, on the other hand, there is a shortfall at decision block 218, the microgrid controller logic 232 proceeds to the generator subroutine 220 to fill the shortfall, after which it checks to see if there is still a shortfall at decision block 222.

If there is no shortfall, the process returns to the beginning at step 202. If, on the other hand, there is a shortfall at decision block 222, the microgrid controller logic 232 proceeds to battery subroutine #3 224 to fill the shortfall, after which it checks to see if there is still a shortfall at decision block 226.

If there is no shortfall, the process returns to the beginning at step 202. If, on the other hand, there is a shortfall at decision block 226, the microgrid controller logic 232 determines there is a power outage at step 228, and renders the EV charging service 114 unavailable at step 230.

Figure 3:
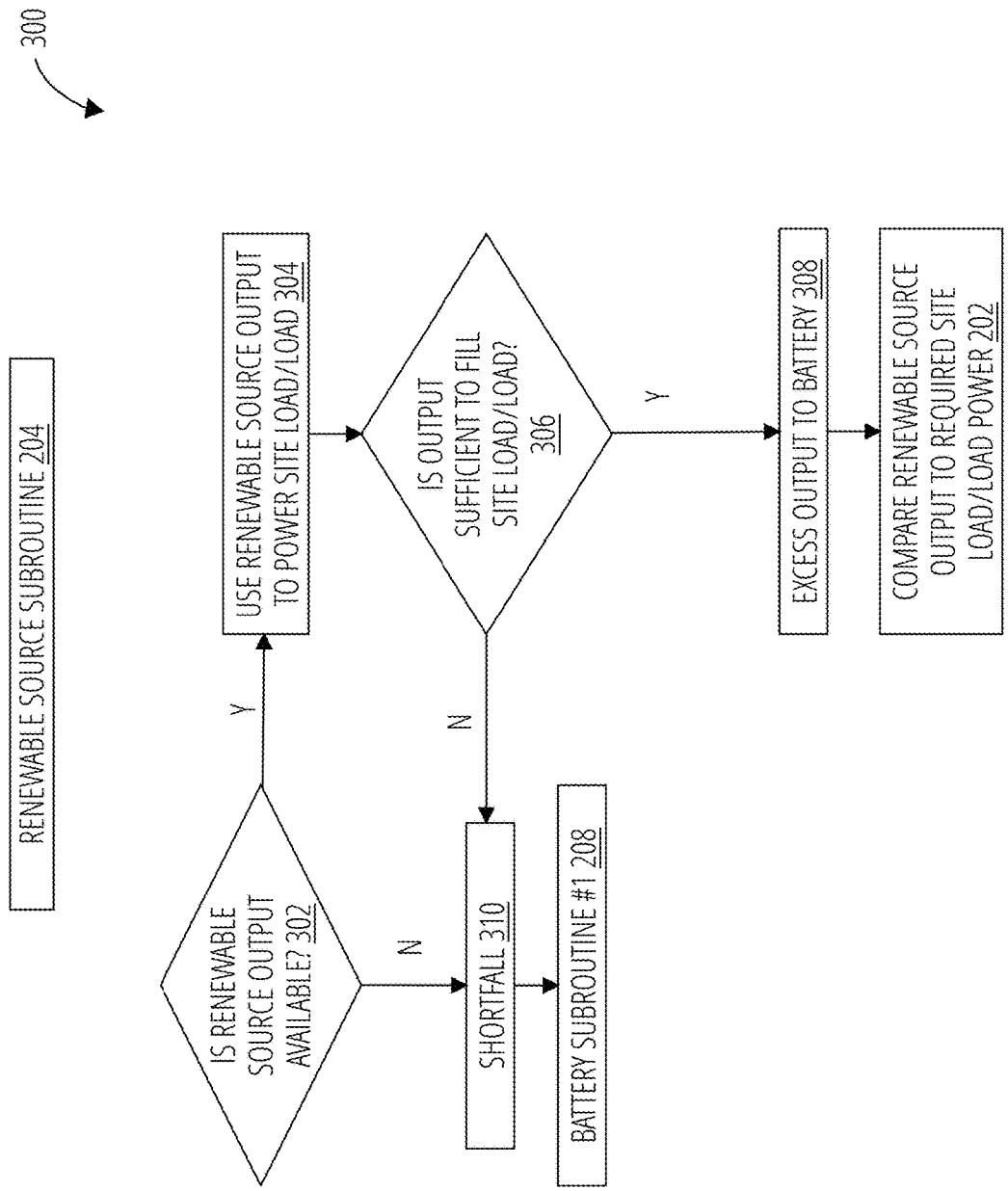
FIG. 3 illustrates a flowchart for a renewable source subroutine in accordance with one embodiment.

FIG. 3 illustrates a flowchart 300 for renewable source subroutine 204 in accordance with one embodiment. The flowchart 300 can be utilized in the flowchart for microgrid controller logic 200

The microgrid controller logic 232 checks to see if there a renewable source output is available for powering the site load 112 or load 118 at decision block 302. For example, if the renewable source is solar energy, solar output is unavailable at night. If a renewable source output is available, it is used to power the site load 112 or load 118 at step 304 charging the load with the renewable source output. The microgrid controller logic 232 checks to see if the renewable source output is sufficient to power the site load 112 or load 118 at decision block 306. If yes, and there is power leftover, the excess power is stored in the battery 110 at step 308 and the process returns to step 202 in FIG. 2.

If, however, the renewable source output is insufficient to power the site load 112 or load 118, then the microgrid controller logic 232 determines there is a shortfall at step 310, and proceeds to battery subroutine #1 208 in FIG. 2.

Figure 4:
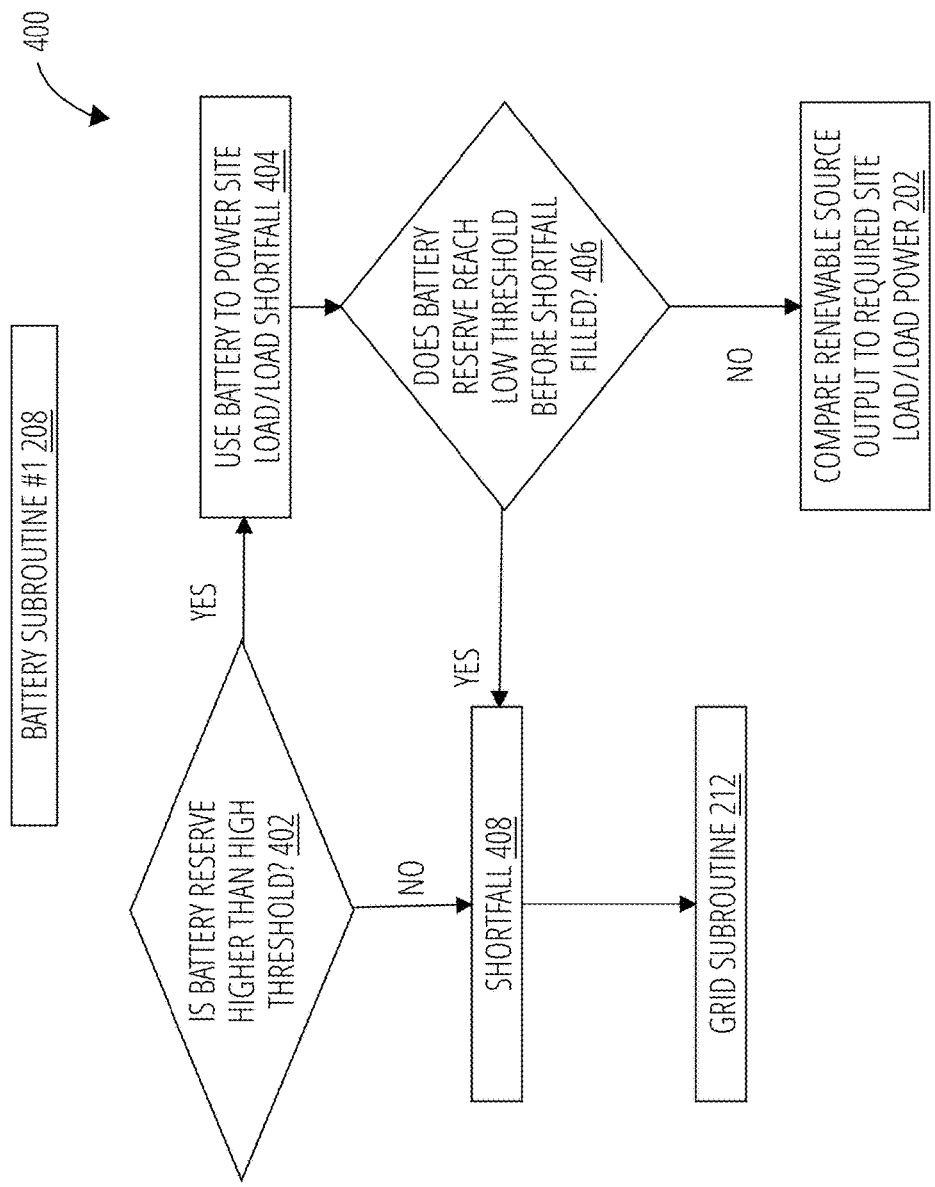
FIG. 4 illustrates a flowchart for a battery subroutine #1 in accordance with one embodiment.

FIG. 4 illustrates a flowchart 400 for battery subroutine #1 208 in accordance with one embodiment. The flowchart 400 can be utilized in the flowchart for microgrid controller logic 200 and flowchart 300 shown in FIG. 3.

The microgrid controller logic 232 first checks to see if the reserve of battery 110 is higher than a high threshold. If the answer is 'yes', then the battery 110 is used to power the site load 112 or load 118 at step 404, until either the reserve of battery 110 reaches a low threshold or the shortfall is filled—whichever comes first (decision block 406). If the shortfall is completely filled by battery 110 before the low threshold is reached, the process returns to the beginning at step 202. If, on the other hand, the low threshold is reached prior to filling the shortfall, the microgrid controller logic 232 determines that there is a shortfall at step 408, and proceeds to grid subroutine 212 in FIG. 2.

Figure 5:
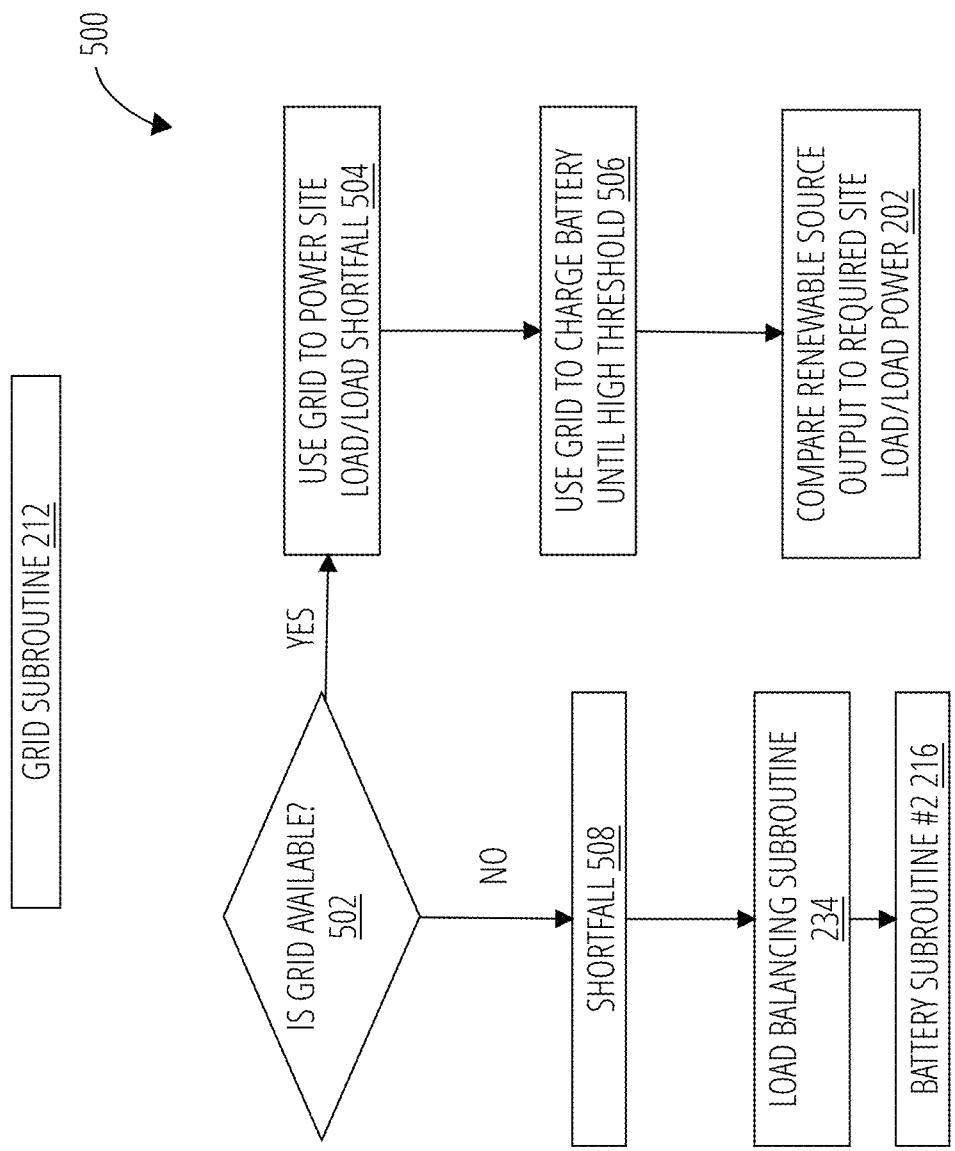
FIG. 5 illustrates a flowchart for a grid subroutine in accordance with one embodiment.

FIG. 5 illustrates a flowchart 500 for grid subroutine 212 in accordance with one embodiment. The flowchart 500 can be utilized in the flowchart for microgrid controller logic 200 and the flowchart 400 shown in FIG. 4.

The microgrid controller logic 232 first checks to see if the grid 104 is available at decision block 502. If the grid 104 is available, it is used to power whatever shortfall remains for the site load 112 or load 118 at step 504. The grid 104 is then used to charge the battery 110 until the battery reserve reaches the high threshold at step 506, after which the process returns to the beginning at step 202.

If, on the other hand, the grid 104 is unavailable, there remains a shortfall in powering the site load 112 or load 118 at step 508, and microgrid controller logic 232 proceeds to battery subroutine #2 216.

Figure 6:
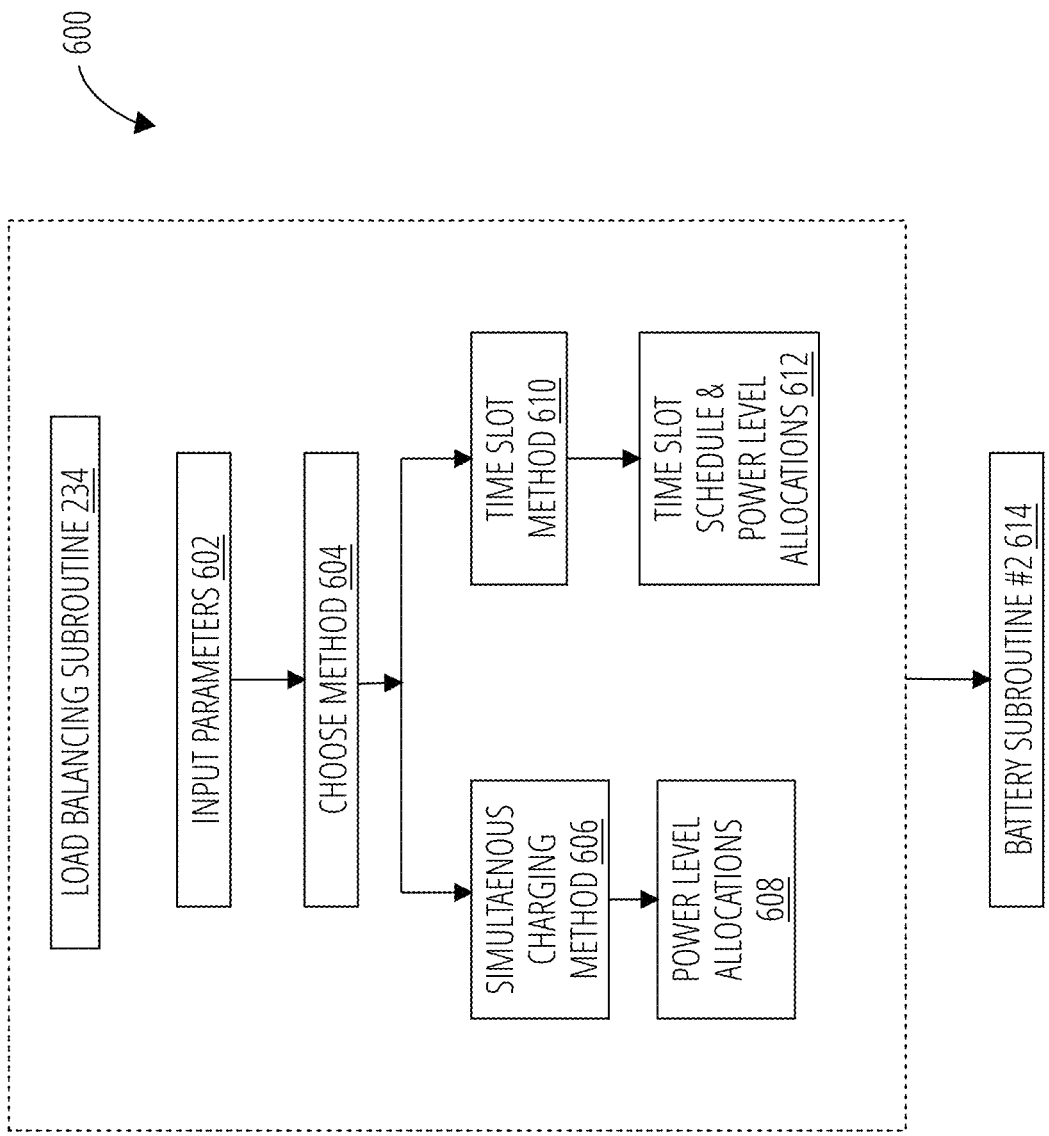
FIG. 6 illustrates a flowchart for a load balancing subroutine in accordance with one embodiment.

FIG. 6 illustrates a flowchart 600 for load balancing subroutine 234 in accordance with one embodiment. The flowchart 600 can be utilized in the flowchart for microgrid controller logic 200 and the flowchart 500 shown in FIG. 5.

Microgrid controller logic 232 uses load balancing subroutine 234 to negotiate a reduced level of power delivery to one or more connected EV chargers, while agreeing upon a proportional allocation of the available power to each of the connected EV chargers. As such, load balancing subroutine 234 is not activated when there are no EV chargers (i.e. when only the site load 112 is being powered).

Once the load balancing subroutine 234 is executed, connected EV chargers may be instructed to operate at reduced power allocation. In some embodiments, where some EV chargers do not support a lowered level of power consumption, the EV chargers may be turned off and on in sequence, implying that one or more of the connected EV chargers get zero power for a short time and then get served later, while other connected EV chargers get zero power.

As shown in FIG. 6, parameters are input into the load balancing subroutine 234 at block 602. A method of load balancing is chosen at block 604, based on the parameters. Either a simultaneous charging method is used (block 606), resulting in an output of power allocations for the EVs (block 608). Or a time slot method is used (block 610), resulting in a time slot schedule and power level allocations for the EVs (block 612). Once the load balancing subroutine 234 is complete, microgrid controller logic 232 reverts to battery subroutine #2 216 in FIG. 2.

In some embodiments, inputs to the load balancing subroutine 234 include: a load balancing "constrained power budget"; the number of active EV chargers active; the start and end times of their respective booked time slots; the battery capacity of each EV connected to its respective EV service equipment (EVSE); the state of charge of each EV battery; a power demand from each EVSE without load balancing constraints; a minimum power level allowable for each active EVSE; and a Guaranteed Service level agreement (if any) for each connected EV based on the subscriber/owner's service agreement (some may have priority charging subscriptions and may need to be given priority under such circumstances).

In some embodiments, an algorithm of the load balancing subroutine 234 may decide on a simultaneous charging method, or a partially simultaneous charging method with a time slot schedule-based approach, based on the input conditions.

First, the power budget allocation for each active EVSE is adjusted, so as to not exceed the constrained Power budget.

Second, a time slot schedule for all connected EVSEs to turn on and off and power allocation for the time slot in case simultaneous power cannot be delivered to all connected EVSEs to meet their minimum power level requirements.

In some embodiments, an algorithm of the load balancing subroutine 234 is based on a module that employs a simultaneous charging method, in which the proportional allocation of the adjusted power level for each EVSE is calculated as a fraction of the Constrained Power budget, after first allocating the guaranteed power level for any EVSE connected to an EV whose subscriber has a guaranteed service level agreement. Next, the module checks if each of the EVSE Minimum allowable power level is satisfied. If this condition is not met, then a time slot schedule method (described below) is used for calculating load balanced power allocations and time slots. The adjusted power level allocations are then output so that they can be communicated to the active EVSEs.

In some embodiments, the output of the load balancing subroutine 234 is based on a module that employs a time slot schedule method, in which the guaranteed power level is assigned to any EVSE with EVs whose subscribers have guaranteed power Next, using a box fitting algorithm, the energy that can be delivered with the remaining constrained power level is maximized, to the remaining EVs in a proportional manner by picking a subset to charge above their respective minimum allowable powers for a fraction of the EV charging slots booked. Iterate over the remaining portion of the booked charging slots to ensure everyone is assigned a charging time slot. The time slot schedule is then output along with the associated power levels for all the active EVSEs.

Figure 7:
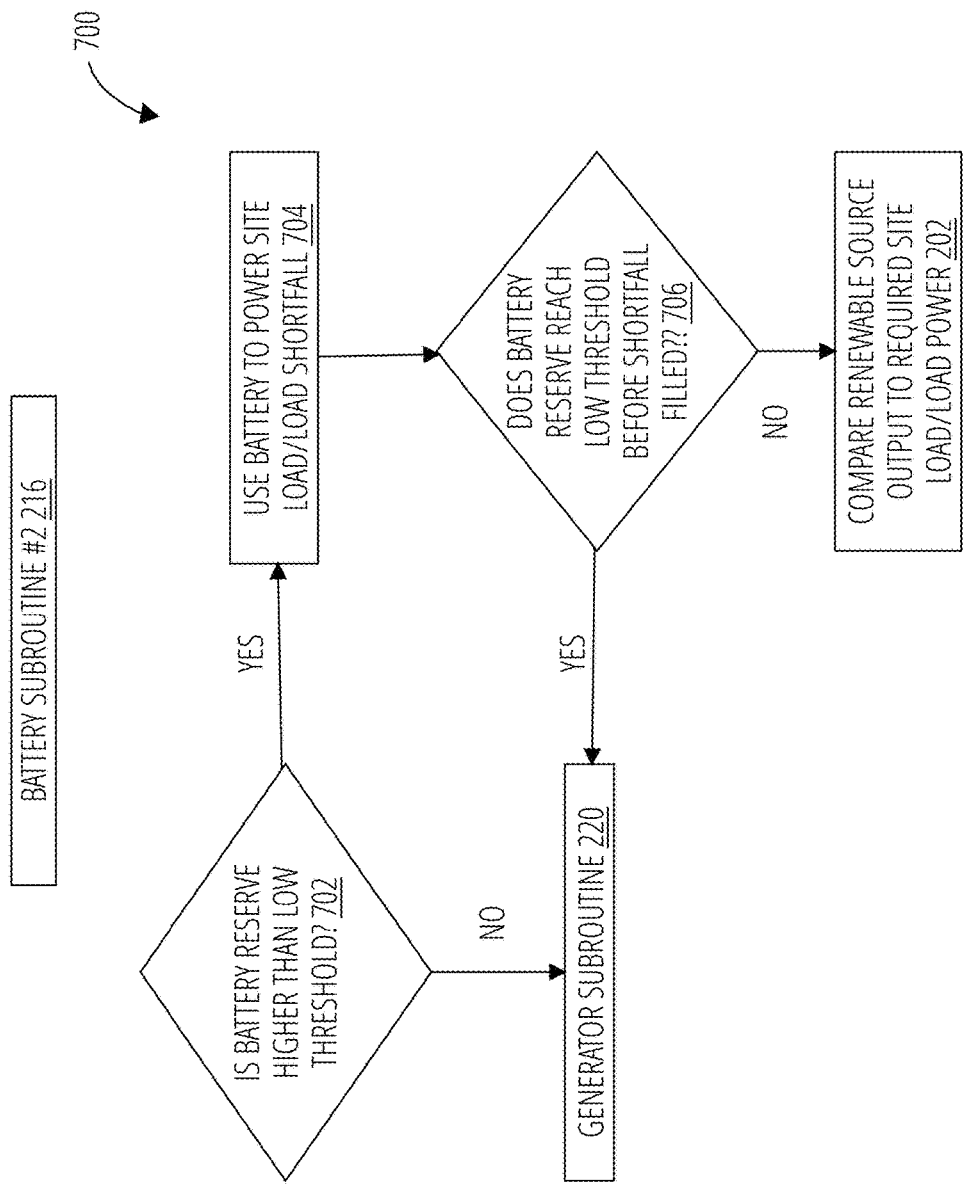
FIG. 7 illustrates a flowchart for a battery subroutine #2 in accordance with one embodiment.

FIG. 7 illustrates a flowchart 700 for battery subroutine #2 216 in accordance with one embodiment. The flowchart 700 can be utilized in the flowchart for microgrid controller logic 200 and the flowchart 500 shown in FIG. 5.

The microgrid controller logic 232 first checks to see if the reserve of battery 110 is higher than the low threshold at decision block 702. If the reserve is higher than the low threshold, then the battery 110 is used to power the site load 112 or load 118 at step 704. The microgrid controller logic 232 checks to see if the battery reserve reaches the low threshold prior to filling the shortfall at decision block 706. If the shortfall is filled prior to the reserve reaching the low threshold, then the process returns to the beginning at step 202. However, if the reserve reaches the low threshold prior to the shortfall being filled, then the microgrid controller logic 232 proceeds to the generator subroutine 220.

Figure 8:
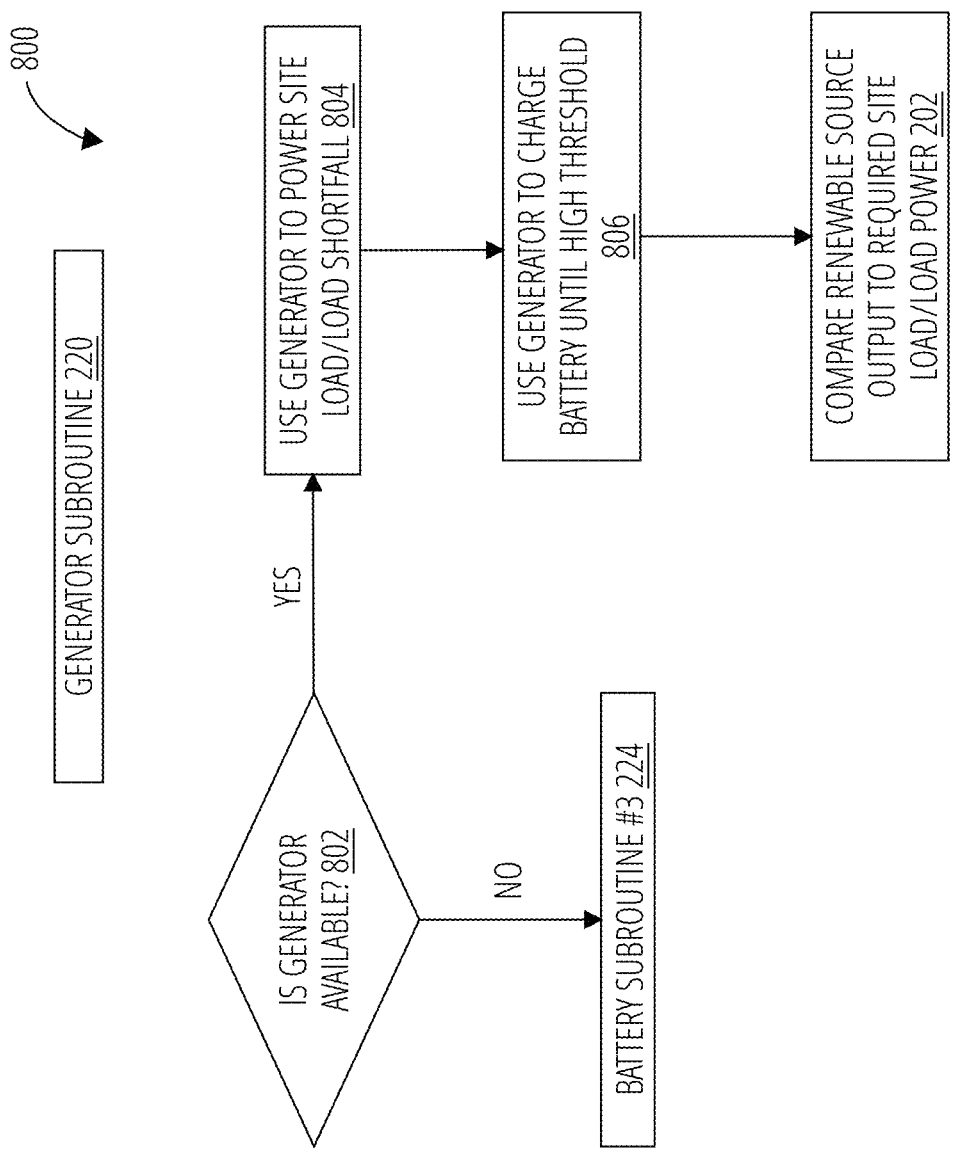
FIG. 8 illustrates a flowchart for a generator subroutine in accordance with one embodiment.

FIG. 8 illustrates a flowchart 800 for generator subroutine 220 in accordance with one embodiment. The flowchart 800 can be utilized in the flowchart for microgrid controller logic 200 and the flowchart 700 shown in FIG. 7.

The microgrid controller logic 232 first checks to see if the generator 106 is available at decision block 802. If the generator 106 is available, it is used to power whatever shortfall remains for the site load 112 or load 118 at step 804. The generator 106 is then used to charge the battery 110 until the battery reserve reaches the high threshold at step 806, after which the process returns to the beginning at step 202.

Figure 9:
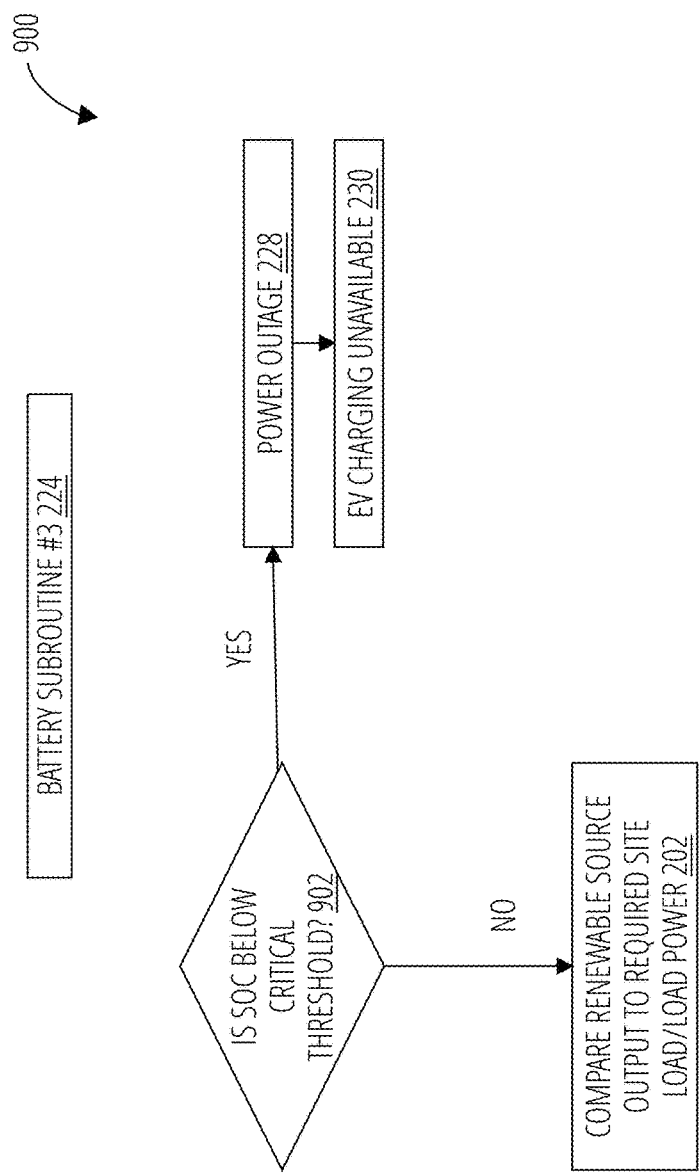
FIG. 9 illustrates a flowchart for a battery subroutine #3 in accordance with one embodiment.

If, on the other hand, the generator 106 is unavailable, there remains a shortfall in powering the site load 112 or load 118; then the microgrid controller logic 232 proceeds to battery subroutine #3 224, FIG. 9 illustrates a flowchart 900 for battery subroutine #3 224 in accordance with one embodiment. The flowchart 900 can be utilized in the flowchart for microgrid controller logic 200 and the flowchart 800 in FIG. 8.

The microgrid controller logic 232 first checks to see if the reserve of battery 110 is higher than a critical threshold at decision block 902. The critical threshold is less than the low threshold at decision block 702 in FIG. 7. If the reserve is higher than the critical threshold, then the microgrid controller logic 232 returns to the beginning at step 202. However, if the reserve is below the critical threshold then the microgrid controller logic 232 proceeds to step 228, where there is a power outage. It follows that the EV charging service 114 is not available.

Figure 10:
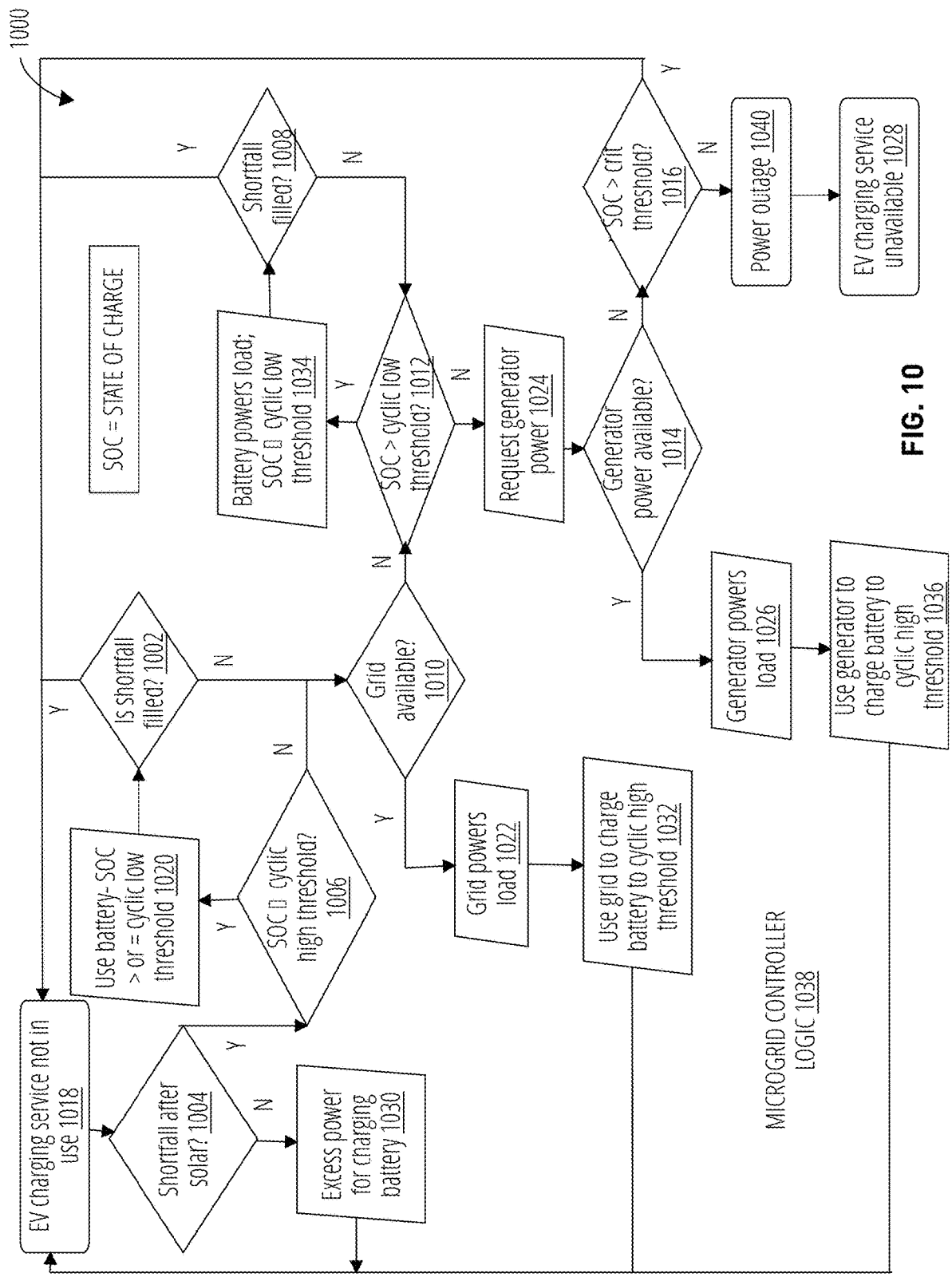
FIG. 10 illustrates a flowchart for a microgrid controller logic in accordance with one embodiment.

FIG. 10 illustrates a flowchart 1000 of microgrid controller logic 1038 in accordance with one embodiment. FIG. 10 shows an example of microgrid controller logic 1038 that can be utilized in a configuration shown in FIG. 1, when the EV charging service 114 is not in use, and smart grid controller 102 is used to charge the site load 112 only. While the embodiment shown in FIG. 10 refers to solar energy, any suitable renewable source 108 can be used.

In FIG. 10, solar production is used towards charging the site load 112, while any excess is used to charge the state of charge (SOC) of battery 110 until it equals a cyclic high threshold. In addition, further excess can be optionally used to charge the secondary battery 116. The grid 104 and the generator 106 can be used to power the load 118 and charge battery 110 until the SOC of battery 110 is equal to the cyclic high threshold (and optionally secondary battery 116). The respective values of the low and high cyclic threshold are configurable.

In the embodiment shown in FIG. 10, the EV charging service 114 is not in use (step 1018). The microgrid controller logic 1038 prioritizes the use of renewable source 108 (in this embodiment, solar energy) to power the site load 112, and charge battery 110 (and optionally secondary battery 116) using excess solar production. The grid 104 and generator 106 are used to charge the battery 110 until cyclic high threshold values are attained. The battery 110 can only be used if the State of Charge (SOC) of the battery 110 is greater than a cyclic low threshold.

The embodiment of the microgrid controller logic 1038 shown in FIG. 10 is described as follows. Since solar power is one of the cheaper sources in the microgrid configuration 100, the microgrid controller logic 1038 uses solar output to power the site load 112, and checks to see if there is a shortfall (that is, solar energy is insufficient to fully power the site load 112) at decision block 1004. If the solar output is sufficient, and after powering the site load 112 load with the solar output, there is power leftover, the excess power is stored in the battery 110 (step 1030), followed by a return to the beginning at step 1018.

If, at decision block 1004, the microgrid controller logic 1038 determines that the solar output is insufficient to power the site load 112, then the microgrid controller logic 1038 determines if the battery 110 can be used to charge the site load 112 by checking if the battery storage state of charge (SOC) of the battery 110 is greater than or equal to a cyclic high threshold at decision block 1006. The cyclic high threshold is configurable and can be measured as a percentage of the full batter charge. In some embodiments, the cyclic high threshold is from 60% to 99% of the battery charge; or from 70% to 90% of the battery charge; or from 75% to 85% of the battery charge; or about 80% of the battery charge.

If the SOC is greater than or equal to the cyclic high threshold at decision block 1006, then the battery 110 is used to charge the site load 112 at step 1020, until the SOC reaches the low cyclic threshold—unless the shortfall is filled first. At decision block 1002 the microgrid controller logic 1038 checks to see if the shortfall has been filled. If it has, the process returns to the beginning at step 1018. If, on the other hand, there is still a shortfall, then the microgrid controller logic 1038 proceeds to the grid 104 (decision block 1010).

If the grid 104 is available, then it is used to fill the shortfall completely at step 1022, optionally followed by step 1032 in which the SOC of battery 110 is charged to the cyclic high threshold. The process then returns to the beginning at step 1018.

If, on the other hand, grid 104 is unavailable, then the microgrid controller logic 1038 checks the battery 110 once more, to see if the SOC of battery 110 is greater than the cyclic low threshold at decision block 1012. Grid 104 may be unavailable if there is an act of nature that cuts off power to the grid. If the SOC is greater than the cyclic low threshold, then the battery 110 is used to charge the load, until the SOC equals the cyclic low threshold at step 1034. The microgrid controller logic 1038 checks to see if the shortfall has been filled at decision block 1008. If yes, then the process returns to the beginning at step 1018. If not, then the microgrid controller logic 1038 returns to decision block 1012, where the SOC is equal to the cyclic low threshold; the generator 106 is requested to power site load 112 at step 1024.

If the generator 106 is available (decision block 1014), then the generator 106 is used to fill the shortfall and power the load 118 at step 1026, followed by optionally charging the battery 110 until the SOC is equal to the cyclic high threshold at step 1036. Subsequently, the process returns to the beginning at step 1018.

If, on the other hand, the generator 106 is not available, then the microgrid controller logic 1038 checks the battery 110 to see if the state of charge is greater than a critical threshold. The critical threshold is less than the cyclic low threshold at decision block 1012. If the state of charge is greater than the critical threshold, then the process returns to the beginning at step 1018 If, on the other hand, the state of charge of battery 110 is less than the critical threshold, then there is a power outage at step 1040, while the EV charging service is unavailable (step 1128).

Figure 11:
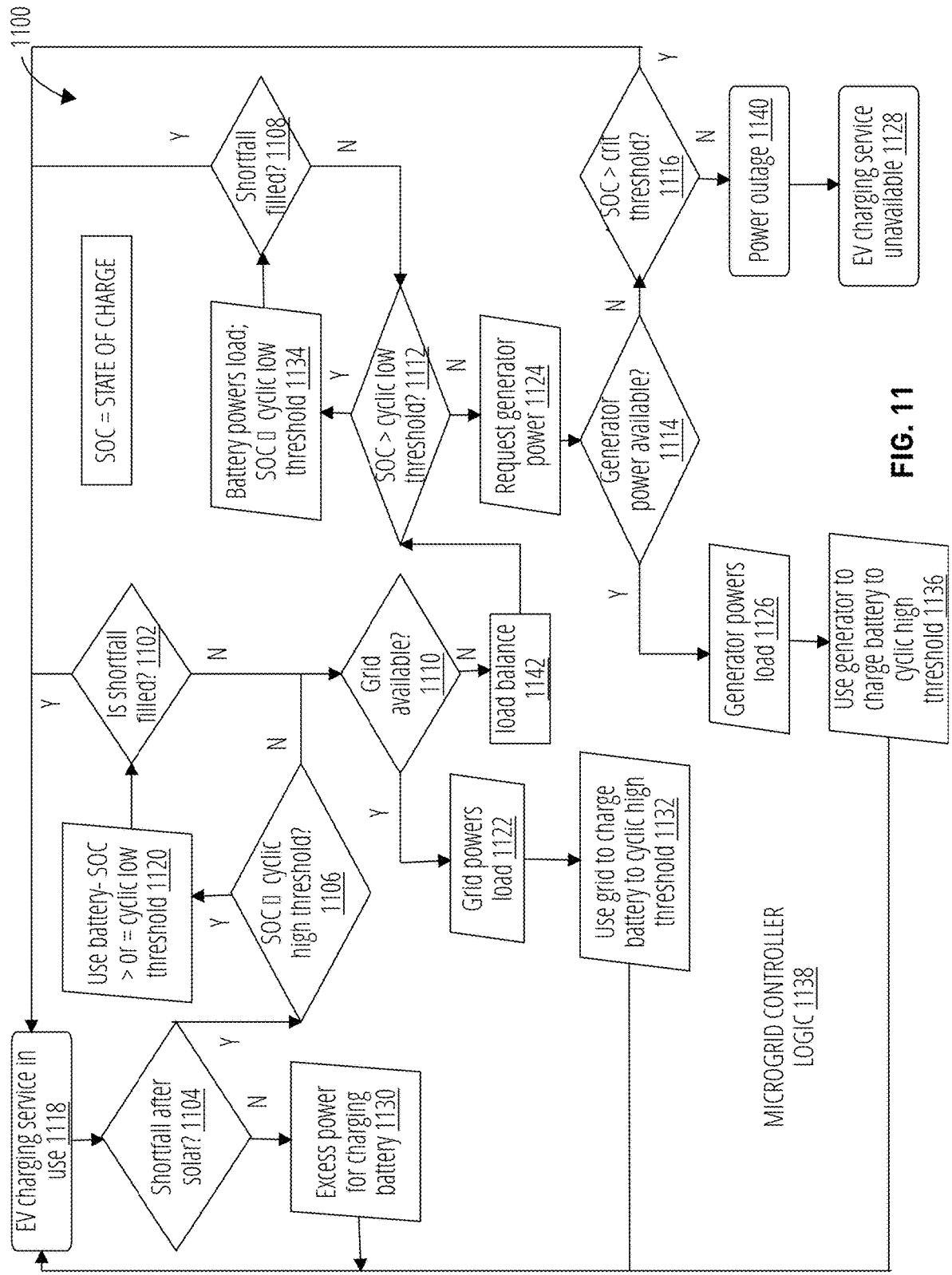
FIG. 11 illustrates a flowchart for a microgrid controller logic in accordance with one embodiment.

FIG. 11 illustrates a flowchart 1100 for microgrid controller logic 1138 in accordance with one embodiment. The flowchart 1100 shows an example of microgrid controller logic 1138 that can be utilized in a configuration shown in FIG. 1, when the EV charging service 114 is in use, and smart grid controller 102 is used to charge the load 118. While the embodiment shown in FIG. 11 refers to solar energy, any suitable renewable source 108 can be used.

In FIG. 11, solar production is used towards charging the load 118, while any excess is used to charge the state of charge (SOC) of battery 110 until it equals a cyclic high threshold. In addition, further excess can be optionally used to charge the secondary battery 116). The grid 104 and the generator 106 can be used to power the load 118 and charge battery 110 until the SOC of battery 110 is equal to the cyclic high threshold (and optionally secondary battery 116). The respective values of the low and high cyclic threshold are configurable.

In the embodiment shown in FIG. 11, the EV charging service 114 is in use (step 1118). The microgrid controller logic 1138 prioritizes the use of renewable source 108 (in this embodiment, solar energy) to power the load 118 (which is a combination of the load 118 and any entity that uses EV charging service 114), and charge battery 110 (and optionally secondary battery 116) using excess solar production. The grid 104 and generator 106 are used to charge the battery 110 until cyclic high threshold values are attained. The battery 110 can only be used if the State of Charge (SOC) of the battery 110 is greater than a cyclic low threshold.

The embodiment of the microgrid controller logic 1138 shown in FIG. 11 is described as follows. Since solar power is one of the cheaper sources in the microgrid configuration 100, the microgrid controller logic 1138 uses solar output to power the load 118, and checks to see if there is a shortfall (that is, solar energy is insufficient to fully power the load 118) at decision block 1104. If the solar output is sufficient, and after powering the load with the solar output, there is power leftover, the excess power is stored in the battery 110 (step 1130), after which the microgrid controller logic 1138 returns to the beginning at step 1118.

If, at decision block 1104, the microgrid controller logic 1138 determines that the solar output is insufficient to power the load 118, then the microgrid controller logic 1138 determines if the battery 110 can be used to charge the load 118 by checking if the battery storage state of charge (SOC) of the battery 110 is greater than or equal to a cyclic high threshold at decision block 1106. The cyclic high threshold is configurable and can be measured as a percentage of the full batter charge. In some embodiments, the cyclic high threshold is from 60% to 99% of the battery charge; or from 70% to 90% of the battery charge; or from 75% to 85% of the battery charge; or about 80% of the battery charge.

If the SOC is greater than or equal to the cyclic high threshold at decision block 1106, then the battery 110 is used to charge the load 118 at step 1120, until the SOC reaches the low cyclic threshold—unless the shortfall is filled first. At decision block 1102 the microgrid controller logic 1138 checks to see if the shortfall has been filled. If it has, the process returns to the beginning at step 1118. If, on the other hand, there is still a shortfall, then the microgrid controller logic 1138 proceeds to the grid 104 (decision block 1110).

If the grid 104 is available, then it is used to fill the shortfall completely at step 1122, optionally followed by step 1132 in which the SOC of battery 110 is charged to the cyclic high threshold, followed by a return to the beginning at step 1118.

If, on the other hand, grid 104 is unavailable, then the microgrid controller logic 1138 performs a load balance 1142, prior to checking the battery 110 once more, to see if the SOC of battery 110 is greater than the cyclic low threshold at decision block 1112. Grid 104 may be unavailable if there is an act of nature that cuts off power to the grid. If the SOC is greater than the cyclic low threshold, then the battery 110 is used to charge the load, until the SOC equals the cyclic low threshold at step 1134. The microgrid controller logic 1138 checks to see if the shortfall has been filled at decision block 1108. If yes, then the process returns to the beginning at step 1118. If not, then the microgrid controller logic 1138 returns to decision block 1112, where the SOC is equal to the cyclic low threshold; the generator 106 is requested to power load 118 at step 1124.

If the generator 106 is available (decision block 1114), then the generator 106 is used to fill the shortfall and power the load 118 at step 1126, followed by optionally charging the battery 110 until the SOC is equal to the cyclic high threshold at step 1136; and the subsequent return to step 1118. If, on the other hand, the generator 106 is not available, then the microgrid controller logic 1138 checks the battery 110 to see if the state of charge is greater than a critical threshold. The critical threshold is less than the cyclic low threshold at decision block 1112. If the state of charge is greater than the critical threshold, then the process returns to the beginning at step 1118. If, on the other hand, the state of charge of battery 110 is less than the critical threshold, then there is a power outage at step 1140, while the EV charging service is unavailable (step 1128).

The execution of the microgrid controller logic 1138 can be further described through a series of non-limiting examples, in which the site load 112 requires 40 kW and an electrical vehicle that uses the EV charging service 114 requires 10 kW, so that the load 118 requires 50 kW.

Example 1: In this example, the current solar output of 60 kW. This is more than enough solar output to power the load 118; an excess of 10 kW is used to charge the battery 110 at step 1130.

Example 2: In this example, the current solar output of 30 kW, the cyclic high threshold is 80%, and it is determined that the SOC of battery 110 is greater than the cyclic high threshold.

At decision block 1104, it is determined that the load 118 is not fully powered by the solar output, and there is a shortfall of 20 kW. The microgrid controller logic 1138 configures the system to proceed to the battery 110 to fill the shortfall. In this example, since the SOC is greater than the cyclic high threshold, the battery 110 can be used to power the load 118. The battery 110 proceeds to power the load 118 to cover the shortfall of 20 kW. In this example, the shortfall of 20 kW is reached before the cyclic low threshold is reached.

Example 3: In this example, the current solar output of 30 kW, and it is determined that the SOC of battery 110 is less than the high cyclic threshold. In addition, the grid 104 is available.

At decision block 1104, it is determined that the load 118 is not fully powered by the solar output, and there is a shortfall of 20 kW. The microgrid controller logic 1138 configures the system to proceed to the battery 110 to fill the shortfall. Since the SOC is less than the cyclic high threshold, the battery 110 cannot be used to power the load 118. The microgrid controller logic 1138 proceeds to step 1122 where grid 104 is then used to power the load 118 by providing the shortfall of 20 kW. The grid 104 can be used to optionally charge the battery 110 until the SOC equals the cyclic high threshold.

Example 4: In this example, the current solar output is 30 kW, and it is determined that the SOC of battery 110 is greater than the cyclic high threshold, and the grid 104 is available. The microgrid controller logic 1138 proceeds as in Example 3. However, in this example, at step 1120, the SOC of battery 110 reaches its cyclic low threshold before filling the shortfall of 20 kW. Since the shortfall is not filled (decision block 1102), the microgrid controller logic 1138 uses the grid 104 to fill the shortfall at step 1122, and optionally proceeds to charge the battery 110 such that its SOC is equal to the cyclic high threshold at 330.

Figure 12:
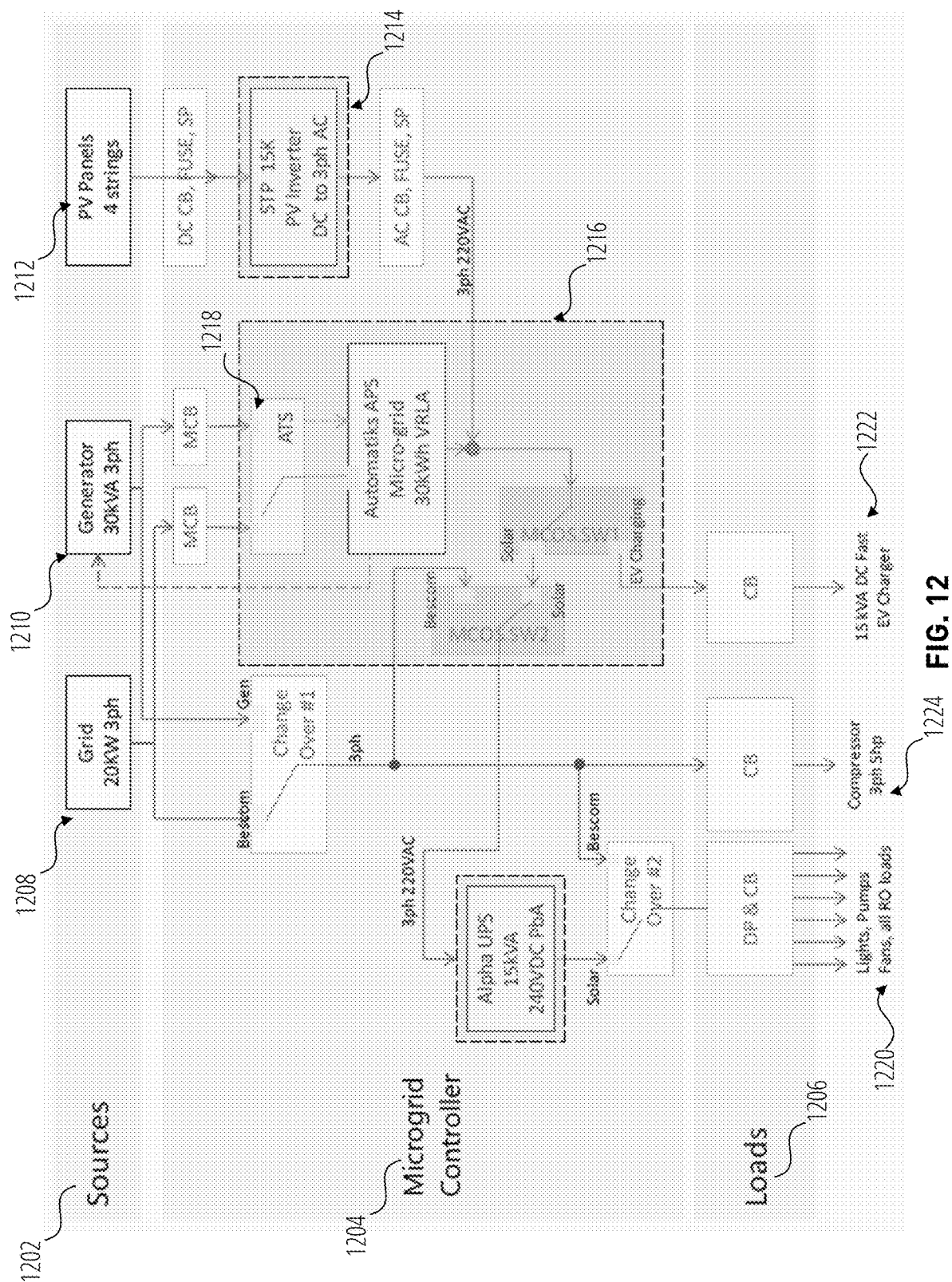
FIG. 12 illustrates an embodiment of the microgrid configuration shown in FIG. 1.

FIG. 12 illustrates an embodiment of the microgrid configuration 100 shown in FIG. 1. Energy Sources 1202 include a grid 1208, a generator 1210 and a plurality of solar panels 1212 with a photovoltaic inverter 1214. The microgrid controller 1204 comprises a microgrid 1216 and an ATS 1218. The microgrid controller 1204 controls the output of each of the energy sources 1202, to a plurality of loads 1206, which include a site load 1220, a compressor 1224 and an EV charging service 1222. As shown in FIG. 12, the site load 1220 includes lights, pumps, fans and all retail outlet loads. In FIG. 12, the EV charging service 1222 is a 15 kVA DC Fast EV charger. The compressor 1224 is a 3 ph 5 hp compressor.

Data Structures and Methods for EV Charging and Billing

Many state and country regulations worldwide, do not allow the reselling of utility electricity for a profit. EV charging represents such a reselling and is subject to pricing regulations. In some cases, energy sourced from the utility may be combined with privately-generated and stored renewable energy at the site.

A method and applicable data structures can be used to store the history of parameters relating to the generated or stored renewable energy and purchased grid energy. This stored and calculated history can used to disambiguate the exact source and amount of energy used during EV charging. This approach allows for compliance with regulatory requirements for transparency, as well as for the creation and delivery of billing that adheres to such regulations. Often, such regulations may require that a billing method should include individual components to be declared separately and billed at a different rate.

The present disclosure describes such a method, data structures and how they are calculated and updated.

Described herein is a method for measuring and billing charging based on self-generated and grid-sourced energy at the same site. This is applicable for EV chargers connected according to the following four different arrangements:
1. Directly to the grid (Pure Grid)
2. Distributed sources such as renewable source(s), battery, generator and the grid (Blended Off-grid)
3. Completely off-grid with isolated sources such as renewable source(s) and generators (Off Grid)
4. Only one source at any time powers the EV charging (Manual)

Battery Charging

To account for multiple sources used to charge a battery, a filter can be utilized to record the power from the grid or multiple renewable sources and record the power from each source in a data structure. This procedure can be performed whenever energy is stored into the microgrid battery. This may occur during, or outside, an EV charging incident.

Figure 13:
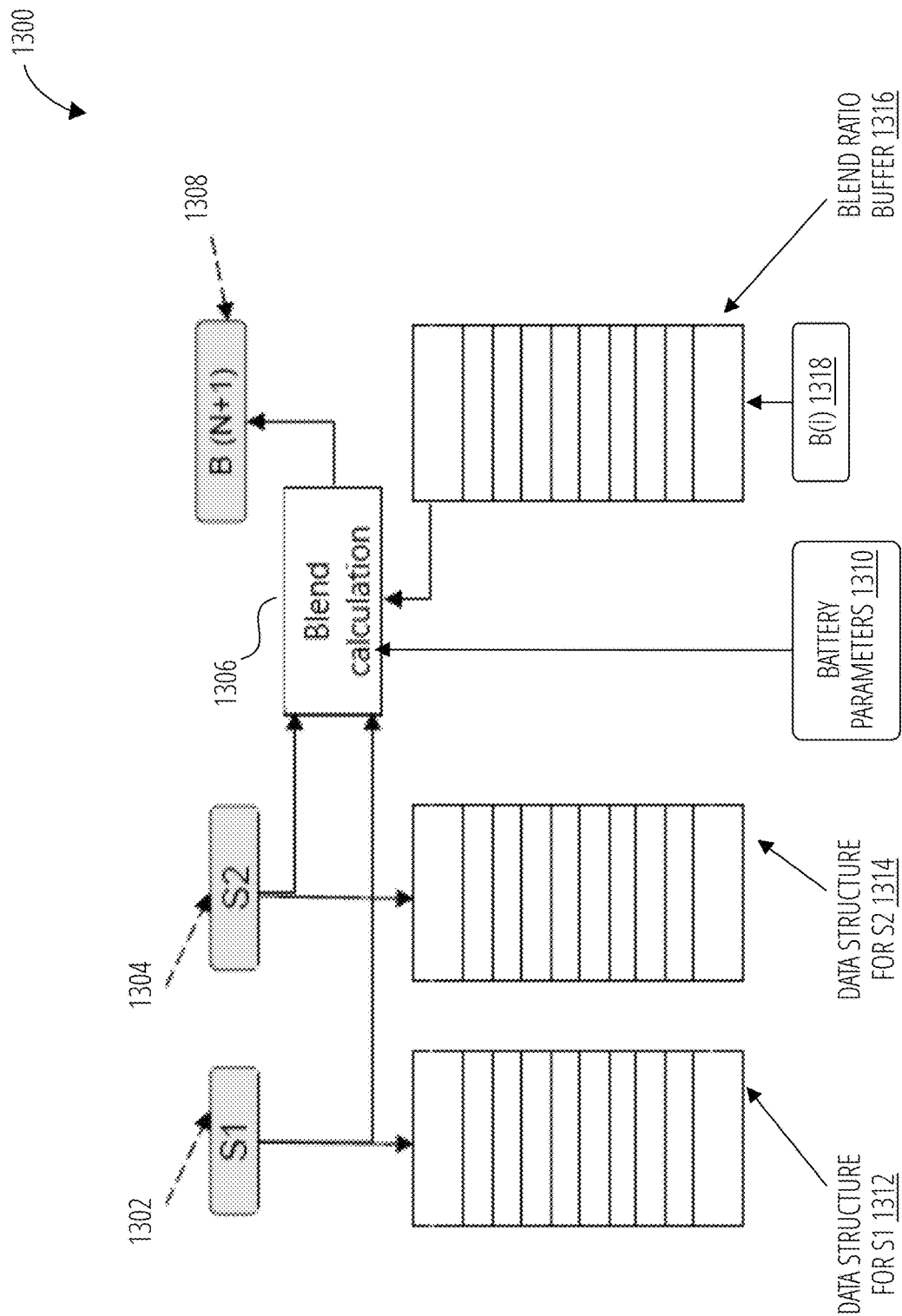
FIG. 13 illustrates a procedure in accordance with one embodiment.

FIG. 13 illustrates a procedure 1300 in accordance with one embodiment, in which two sources (source S1 1302, Source S2 1304) are used to charge a battery.

While two sources, S1 and S2 are shown, it is understood that fewer or more sources can be represented. Each of source S1 1302 and source S2 1304 represents the current interval value of energy contribution to the battery from the respective source. Data structure for S1 1312 includes a time stamp, the interval since the previous time stamp; and the interval energy, the average power, the maximum power, and the minimum power during the interval, with reference to source S1 1302. Data structure for S2 1314 contains similar information with respect to source S2 1304. Each source has information about its energy production and its interval. A filter aligns the disparate timings of the information by using interpolation.

The blend ratio buffer 1316 contains each of the blended values B(i) 1318, which is a list of sources S1, S2, along with their cumulative contributions to the blend, up until the current time. The total of these contributions totals 100%. Each interval of the blended value B(i) 1318 is stored in blend ratio buffer 1316. The (N+1)st blended value 1308 is calculated (as shown below) and subsequently stored as the next entry in a blend ratio buffer 1316.

Blend calculation 1306 is performed periodically, whenever the battery 110 is charged. The blend ratio buffer 1316 stores the previous values of the calculated B(i) 1318, produced by the blend calculation 1306. Other than the current value of the blend, B(n), the previous values are stored for analysis.

The blend calculation 1306 uses source S1 1302, source S2 1304, values B(i) 1318 from the blend ratio buffer 1316 and battery parameters 1310. In some embodiments, battery parameters 1310 include a maximum capacity of the battery 110 (in kWh) and the current state of charge of the battery 110.

The mathematical representation of data structures and calculations for the stored energy blend is as follows:

$(S1)_t$ = Recorded power of source $S1$ at instant '$t$', in units of kWh;

$(S2)_t$ = Recorded power of source $S2$ at instant '$t$', in units of kWh;

$T_t$ = Timestamp at instant '$t$';

$(B_L)_t$ = Power delivered to the battery at '$t$';

$B_C$ = Battery capacity;

$Total_B$ = Total electric power stored in the battery;

$SOC_t$ = State of charge of the battery at instant '$t$';

$(Total_{S1})_t$ = Total electric power stored in the batter from source $S1$;

$(Total_{S2})_t$ = Total electric power stored in the batter from source $S2$;

$(SF_{S1})_t$ = Split factor ($SF$) for source $S1$, at instant '$t$'; $0 < (SF_{S1})_t \leq 1$;

$(SF_{S2})_t$ = Split factor ($SF$) for source $S2$, at instant '$t$'; $0 < (SF_{S2})_t \leq 1$;

$(SF_{S1})_t + (SF_{S2})_t = 1$;

Data Structure = $\{SOC_t, \{(SF_{S_1})_t, (SF_{S_2})_t\}\}$ $S_n = \dfrac{(S_n)_t}{T_t - T_{t-1}}$ (kWh)

$(B_L)_t = \displaystyle\sum_{n=1}^{2} S_n$ $(Total_B)_t = (Total_B)_{t-1} + (B_L)_t$ $SOC_t = \dfrac{(Total_B)_t}{B_c} \cdot 100$ $(Total_{S_n})_t = (Total_{S_n})_{t-1} + S_n$ $(SF_{S_n})_t = \dfrac{(Total_{S_n})_t}{(Total_B)_t}$ In the above equations, $S_n$ represents the value in kWh, while $(S_n)_t$ represents the value recorded for the interval $T_t$ to $T_{t-1}$. For example, if $(S_n)_t$=6 kw during the interval $T_t$=10 sec and $T_{t-1}$=0 sec, that is, 6 kW is recorded during an interval of 10 seconds. Since 10 sec=1/360 of an hour, $S_n$, expressed in kWh, is:

$Sn$=6/360 kWh

An example of the blend calculation 1306 is as follows. As stated above, blend calculation 1306 uses as input: the energy value from each source (S1, S2) in units of kWh; the energy in battery 110 prior to the addition of each energy value from each source (S1, S2); the capacity of battery 110 in kWh; and the blend ratio prior to addition of the new energy value from each source (S1, S2). The recorded energy delivered by each source (S1, S2) at a given time stamp, is calculated separately, as discussed above. The blend calculation 1306 is the weighted sum of the new energy with the stored blend, resulting tin a new blend.

For example, the current blend ratio is Bn=40, 60 ratio for S1 and S2. The battery capacity is equal to 100 kW, while the battery State of Charge is 50%. Therefore, prior to addition of new energy from sources (S1, S2), the battery 110 has 50%*100 kWh=50 kWH of energy which was supplied thus far. The breakdown from each sources is as follows: S1 supplied 40%*50 kWh=20 kWH; while source S2 supplied 60%*50 kWh=30 kWh.

In a new time interval, it is determined that the new energy supplied by S1=2 kWh and by S2=4 kWh. The new battery energy total=2 kWh+4 kWh+50 kWh (from before)= 56 kWh. The S1 blend is updated based on the 2 kWh plus a prior contribution of 20 kWh, to give new total of 22 kW. The S2 blend is updated based on 4 kWh plus a prior contribution of 30 kWh to give a total of 34 kWh.

The new blend ratio, B(n+1) is 39.3% for S1 and 60.7% for S2. This is blended value 1308 stored at the top of the blend ratio buffer 1316 for use by billing, if the battery 110 is discharged at the next, or by the next iteration of the blend calculation if the battery 110 continues to be charged.

While two sources S1 and S2 are used in the above set of equations, it is understood that the mathematical equations can be generalized to any number of sources.

Billing During EV Charging

Figure 14:
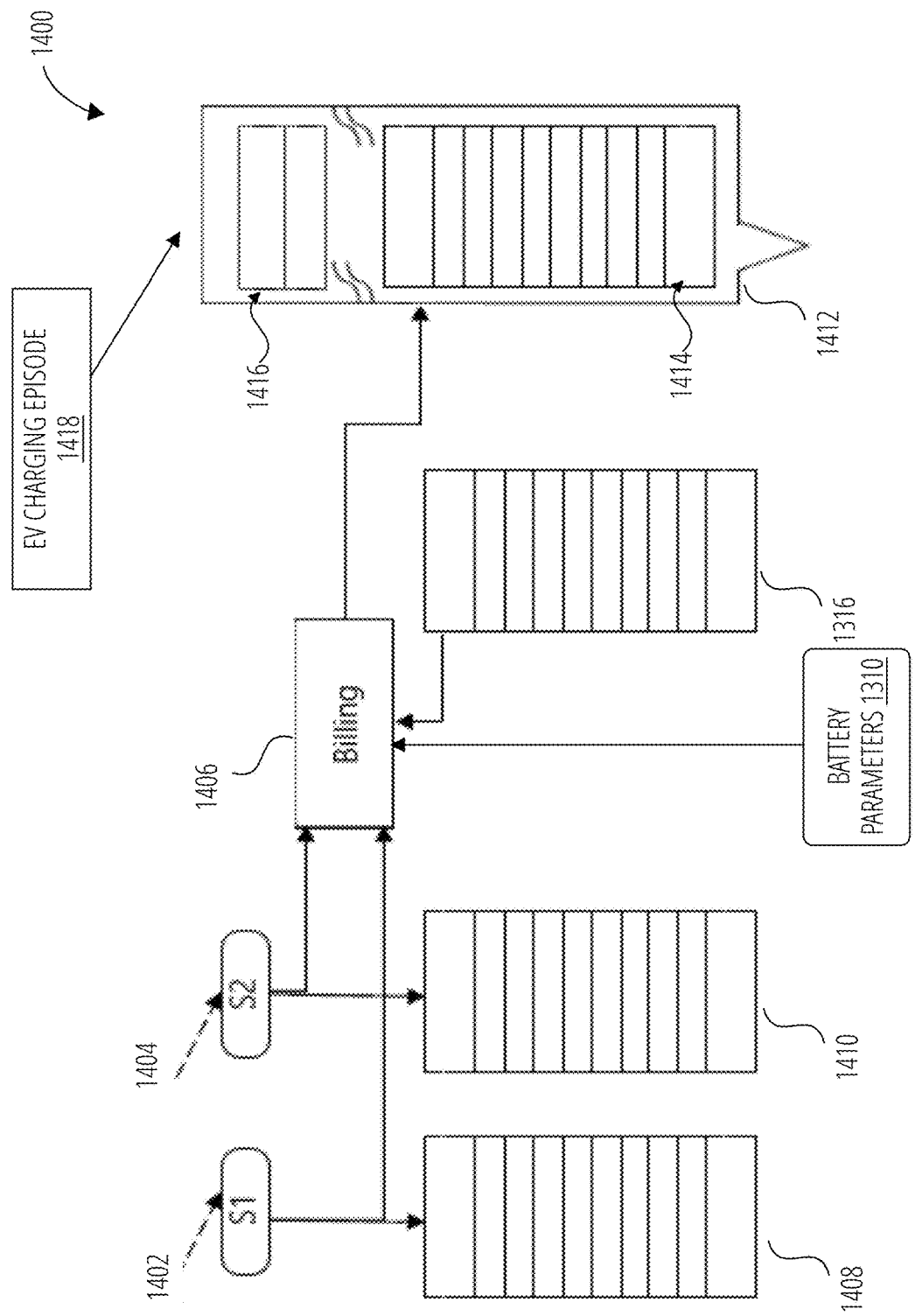
FIG. 14 illustrates a procedure for gathering billing records in accordance with one embodiment.

FIG. 14 illustrates procedure 1400 for gathering billing records in one embodiment. Billing records are gathered during EV charging. This includes periods where the microgrid battery 110 may be discharged during the EV charging.

In FIG. 14, source S1 1402 and source S2 1404 each represent the value of energy contribution from the respective source, to charge the EV during the current interval. While two sources, S1 and S2 are shown, it is understood that fewer or more sources can be represented. Data structure 1408 includes the billing records based on the contribution from source S1 1402 to the EV charging. Similarly, data structure 1410 includes the billing records based on the contribution from source S2 1404 to the EV charging. The EV charging episode 1418 starts at step 1414 and ends at step 1416.

The calculation of billing 1406 uses source S1 1402, source S2 1404, data structure 1408, data structure 1410, battery parameters 1310 and blend ratio buffer 1316. In some embodiments, battery parameters 1310 include a maximum capacity of battery 110 (in kWh) and the current state of charge of battery 110. Data structure 1412 includes information about the EV charging billing record for a single charging incident; each EV charging episode 1418 has a billing record containing the sequence of billing records, each indicating contribution and the price from individual sources and blended storage if applicable, during each interval. At the end of the EV charging episode 1418, this record is summarized into a cumulative summary of contributions that share a common price from each source and stored and uploaded to the server for generating the bill and for reporting purposes. The EV charging episode 1418 is divided into several intervals, as shown by data structure 1412, each entry of which contains the sources that provided power in the that interval and its quantity As an example, for a charging episode, during the first 60-second interval, 4 kWh of energy is derived from solar energy. Over the second 60-second interval, 2 kWh is derived from solar and 2 kWh is derived from battery 110 (at a blend ratio of 80% solar and 20% Grid). Whenever the battery 110 is involved, the current blend ratio is also recorded. Over the third 60-second interval, 4 kWh is derived from the grid (during this interval, the battery may be getting charged and the blend ratio is modified in favor of grid). Over the fourth 60-second interval, 4 kWh is derived from the battery 110 at a blend ratio of 78% solar and 22% grid. During the EV charging episode, all of this data is recorded in data structure for interval data 1510.

For the billing at the end of the episode (step 1416), the total energy provided by each source needs to be available as a separate total, that includes energy directly from that source and energy from that source that came via the battery 110. This can be obtained in one of two ways.

Figure 15:
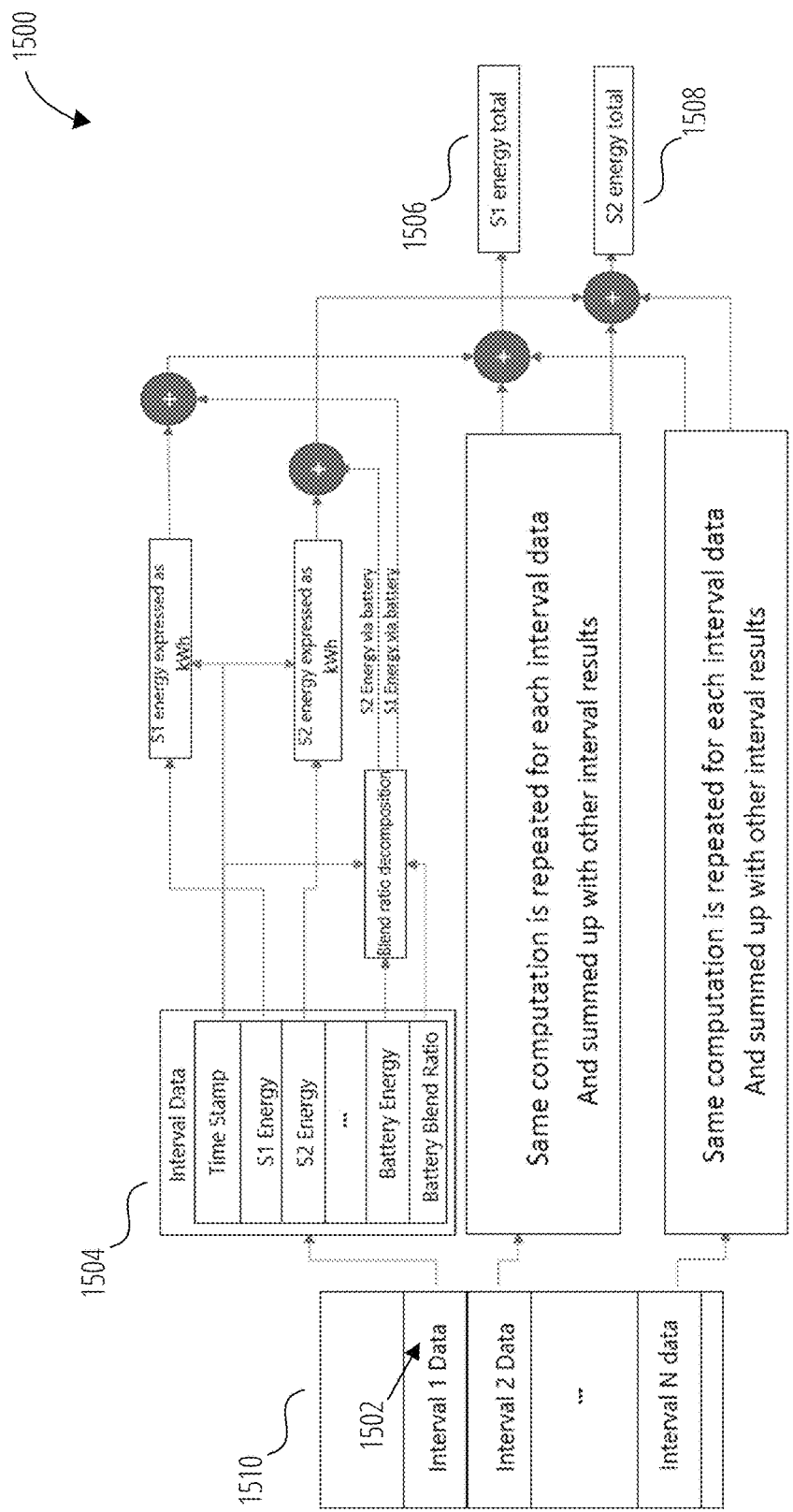
FIG. 15 illustrates one method for gathering billing records in accordance with the embodiment shown in FIG. 14.

FIG. 15 illustrates one method 1500 for gathering billing records in accordance with the embodiment shown in FIG. 14.

In the method 1500, stored interval data in data structure for interval data 1510 is used; summation by source is performed at the end of the EV charging episode (step 1416). For each set of interval data 1504, the energy obtained from each source is computed, by summing up the energy derived directly from the source, and the value of the energy from the same source obtained from battery 110. In FIG. 15, the battery blend ratio and the battery energy are used to decompose the battery blend into its constituent components, such that the energy of source S1 derived from the battery 110 is obtained, as is the energy of source S2 derived from the battery 110. The total energy provided by S1 is the sum of the energy derived directly from S1 and the energy contribution by S1 to battery 110. Similarly, the total energy provided by S2 is the sum of the energy derived directly from S2 and the energy contribution by S2 to battery 110. This computation is performed at each interval. The full contribution 1506 by source S1 to the EV charging episode 1418 is the sum of the total contribution by S1 for each interval. Similarly, the full contribution 1508 by source S2 to the EV charging episode 1418 is the sum of the total contribution by S2 for each interval. Similarly, In the example above, at the end of charging episode, the solar total would be summed up as: 4 kWh from the first interval; 2 kWh directly from solar and 2*0.8=1.6 kWh via battery 110, for a total of 3.6 kWh during the second interval; none during the third interval; and 0.78*4 kWh=3.12 kWh during the fourth interval. The total energy derived from solar is thus 10.72 kWh during this episode of charging an EV. Similarly, the grid total would be summed up as: 0 during the first interval; 2 kWh*0.2=0.4 kWh during interval 2; 4 kWh during interval 3; and 0.22*4 kWh=0.88 kWh during interval 4. The total energy derived from the grid is 5.28 kWh.

Figure 16:
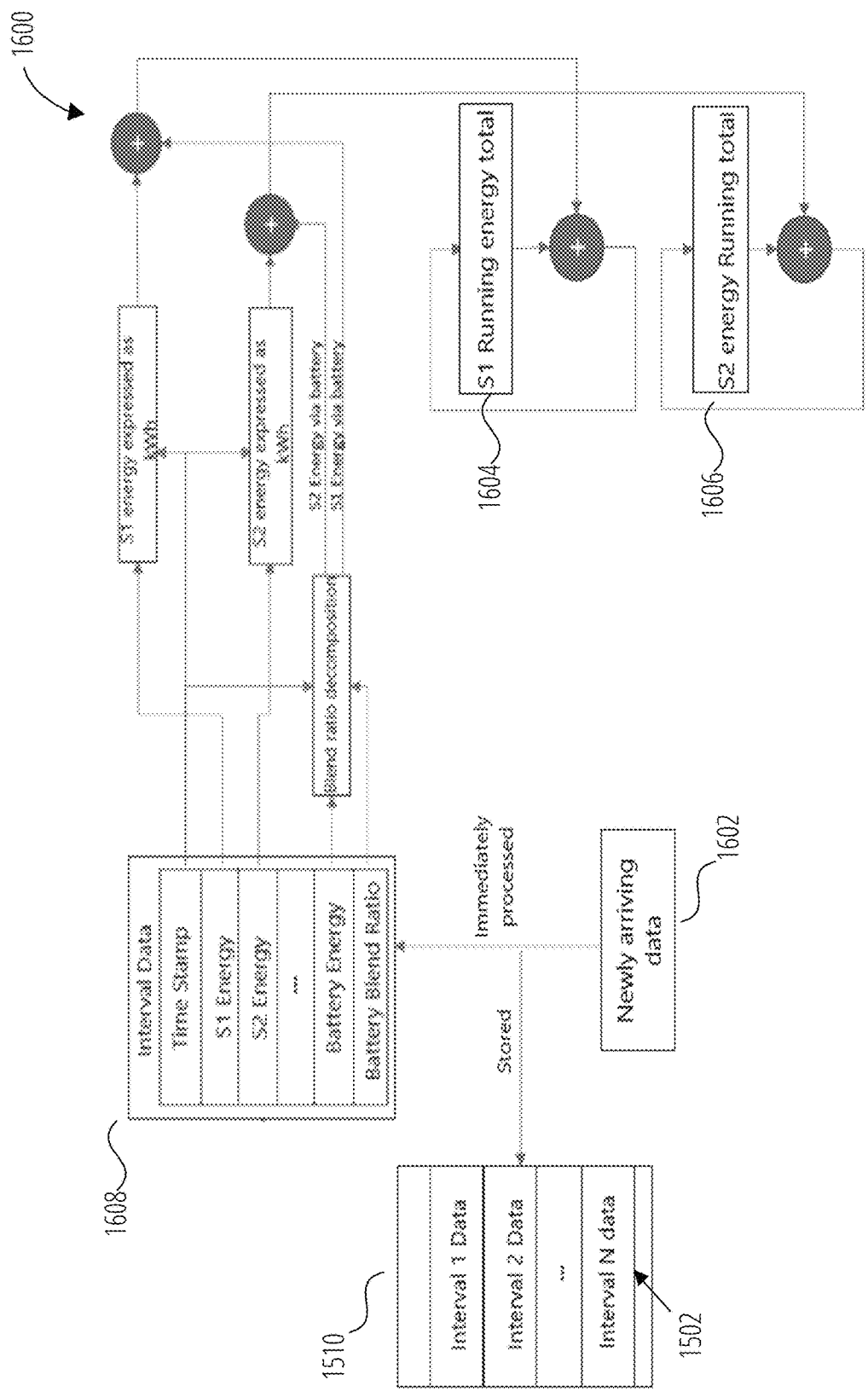
FIG. 16 illustrates a second method for gathering billing records in accordance with the embodiment shown in FIG. 14.

FIG. 16 illustrates a second method 1600 for gathering billing records in accordance with the embodiment shown in FIG. 14.

In the second method, a continually-updating filter is used, while individual running totals are updated for each source as and when each interval data becomes available. Newly arrived data 1602 is immediately processed to provide interval data 1608 for the computation of the running totals for billing, using the computation method as shown in FIG. 15. The processed data is also stored in data structure for interval data 1510. The S1 running energy total 1604 is the sum of all of the S1 energy interval totals; similarly the S2 running energy total 1606 is the sum of all of the S2 energy interval totals.

Battery Discharging

If the battery is discharging, the last recorded values for the State of Charge and the blend ratio for all the resources can be utilized in the billing record for EV charging. Different rates can be used for the sources instead of flat grid rates.

For example, if 'x' kWh was used for EV charging and the last recorded State of Charge and split factors for two sources S1 and S2 are (SOC$_{???}$, {SF$_{S1}$, SF$_{S2}$}). The split between the sources will be:

$$(x*SF_{S_1})+(x*SF_{S_2})=x$$

Billing Records for EV Charging

EV Chargers may operate in one of four scenarios:

Grid Only: Sourcing energy only from the grid;

Blended: Connected to grid but with the addition of distributed sources such as renewable, battery and one or more generators in a microgrid, where the energy from various sources is blended to serve the loads and charge the microgrid battery controller;

Manual: Having multiple sources such as the grid, one or more generators, renewable source, where only one of these sources at any time powers the EV charging.

In some embodiments the renewable source is solar photovoltaic with battery and inversion; and Off grid: Completely off-grid (unconnected to the utility grid), in a microgrid with a renewable source, battery storage and generator, controlled by a microgrid controller.

Each EV charging incident has a billing record containing the sequence of billing records, each of which indicates the contribution and the price from individual sources and blended storage if applicable, during each interval.

At the end of the charging incident, this record is summarized into a cumulative summary of contributions that share a common price from each source. The record is then stored and uploaded to the server for generating the bill and for reporting purposes.

In all of these cases, the billing record method shown above can be employed to calculate the resultant bill for each EV charging incident and stored away for records and regulatory requirements.

Maximizing Business Returns for EV Charging

Sizing of storage and renewable sources is difficult to optimize. Insufficient storage causes energy from renewable sources to be wasted and leads to curtailment of renewables. The correct balance of energy from renewable sources and storage also varies seasonally. Another factor that affects the proper balance is the actual site load and number of EV charging vehicles each day. Provisioning the maximum amount of storage or energy from renewable sources will increase the cost of the system and make the required investment prohibitive.

To address these challenges of unpredictability, a secondary battery port is added to the microgrid system design. The secondary port accommodates addition of, and removal of, one or more batteries at any time during system operation. The disclosed system also includes the ability of the system to provide guidance on when additional storage should be added or may be removed.

The disclosed system increases the efficiency and cost effectiveness of storing variable energy generation and responding to demand. Storage is expensive and thus optimizing the times when secondary storage is charged and discharged can provide for the most economic returns.

The secondary battery elements can be of various forms and types of batteries. In some embodiments, spare swappable battery units that are part of a battery swapping business are used. In some embodiments, electric vehicles with embedded batteries are connected to the system when not in use.

Swapped Battery, Fixed Battery, and Secondary Storage

Secondary Battery Storage

Disclosed herein is a system that provides the capability to add secondary storage that can store excess energy for the site.

The system enables a secondary battery capability that can be connected as a DC element, including but not limited to, batteries used as the swapping asset, in addition to batteries in electric vehicles. Batteries in an electric vehicle may be connected to the secondary port in a manner similar to a vehicle to microgrid, but does not require vehicle-to-grid power electronics to enable use of the battery.

Modularity of Batteries

The batteries are modular and can be added or removed at any time, flexible as dependent on supply and demand of energy storage.

The system provides the ability to connect a secondary set of batteries that can be increased or removed, enabling the use of batteries normally used to swap in and out of vehicles. It also allows for the connection to batteries in vehicles.

Vehicle to Microgrid, Battery Swapping

The system enables use of vehicles to microgrid as a battery to store solar energy, in addition to charging other EVs. The optional secondary battery connected to the smart grid controller represents a removable battery source for vehicle-to-microgrid charging and/or battery swapping.

Predictive Modules in Smart Microgrid Control Storage

The smart microgrid system can guide the addition and removal of storage through predictive modules.

The prediction of number of vehicles and amount of charging required can be performed via a module to optimize storage vehicles. Inputs can include variables for solar generation, local climatic conditions, historical data, seasonal adjustments, site specific performance history, and geographic data. The module can work without one or more of the inputs, but is more effective when all variables are available.

Using a cost function for storing energy in swappable batteries compared to selling the energy, the module can arrive at the amount of energy storage that may be added or removed.

Components of the Secondary Storage Guidance Module

Figure 17:
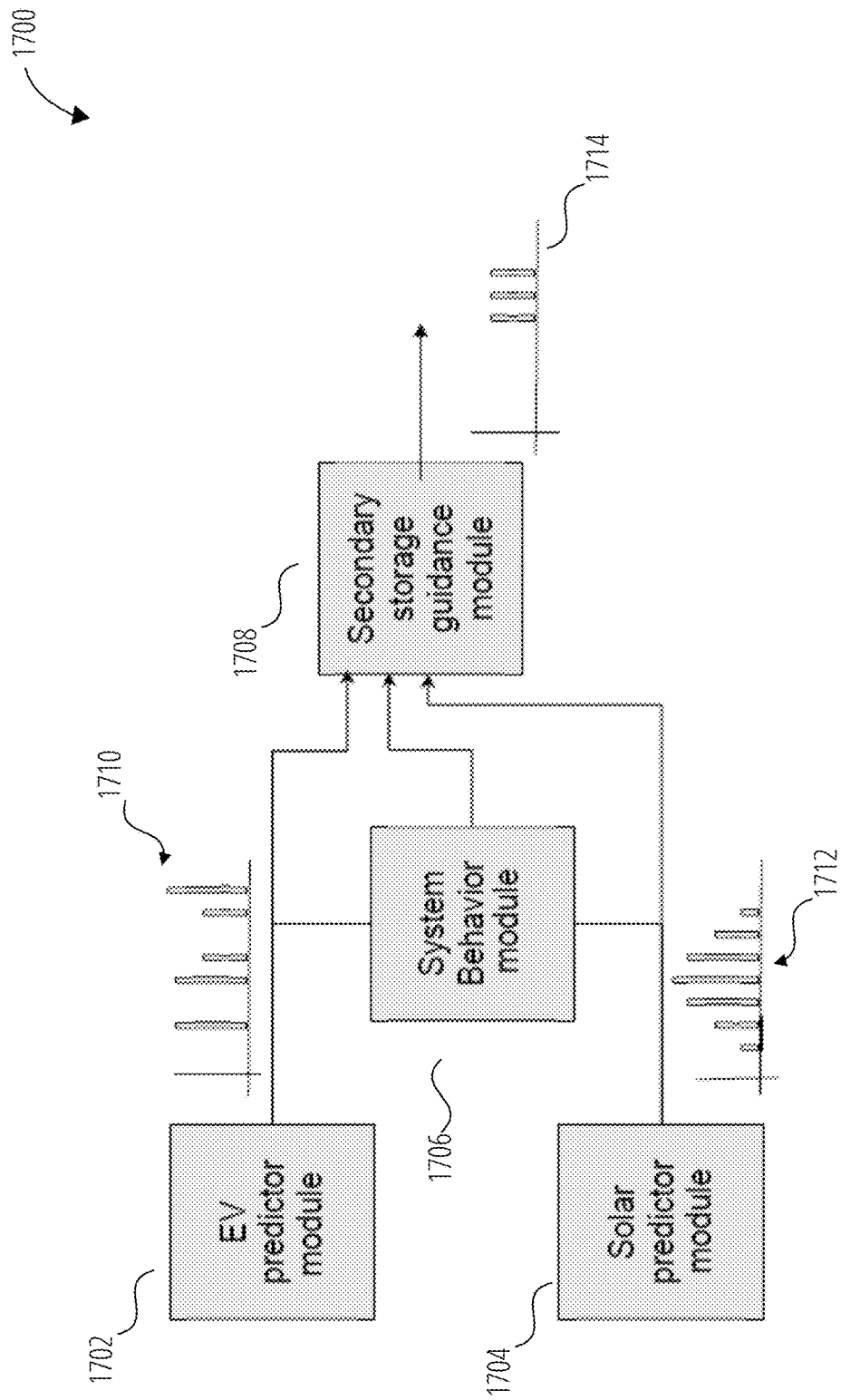
FIG. 17 illustrates a secondary storage guidance module in one embodiment.

FIG. 17 illustrates a secondary storage guidance module 1700 in one embodiment. The secondary storage guidance module 1708 comprises an EV predictor module 1702, a solar predictor module 1704 and a system behavior module 1706, each of which is described below. While a solar predictor module 1704 is shown in FIG. 17, it is understood that a predictor model for one or more additional renewable sources of energy may be used in addition, or in place of solar predictor module 1704.

EV load prediction. In some embodiments, a machine learning model is used for EV load prediction, as illustrated by EV predictor module 1702 in FIG. 17. Examples of inputs for the ML model include: initial seeding information, EV charging load patterns (kWh per charge, rate of charging, duration of charging), historical EV arrival patterns (day of week, monthly and seasonal patterns, holiday schedules, lockdowns, etc.) and EV growth trends. The output of the ML model includes EV arrival and load prediction for a given day, by time of day. Example output 1710 of EV predictor module 1702 shows the arrival and load prediction over the course of day in the form of a bar chart.

Solar output prediction. In some embodiments, a machine learning model is used for solar output production, as shown by solar predictor module 1704 in FIG. 17. Examples of inputs for the ML model include: a location-based historical photovoltaic model, local weather prediction, short-term historical solar production data, historical geographic records for solar illumination, local climatic conditions, seasonal adjustments, and site specific performance history (tree and building shading, etc.) learnt over time using machine learning. The output of the ML model includes solar energy production at a given time of day, for a given day. Example output 1712 of solar predictor module 1704 shows a Gaussian-like bar chart of solar energy production over the course of a day. Where panels that track the sun are used, the output may be more of a rectangular nature.

System behavior model. In some embodiments, a machine learning model is used to model the behavior of the system, as illustrated by system behavior module 1706 in FIG. 17. The ML model can use as input: a historical effectiveness of storage at the given site for the given system sizing; site load patterns; and EV charging load patterns. The output of the system behavior module 1706 includes built-in storage usage prediction at a given day, by time of day. For example, system behavior module 1706 can predict when the shortfalls will occur, when a change of source occurs and how much the site will consume.

The secondary storage guidance module 1708 uses the respective outputs from the EV predictor module 1702, the solar predictor module 1704 and the system behavior module 1706 to provide guidance on when to use secondary storage, and how much to use, over the course of a day—that is, when and how much secondary storage to be used. Example output 1714 of secondary storage guidance module 1708 indicates the use of secondary storage at three instances during the course of a day.

In the EV predictor module 1702, solar predictor module 1704 and system behavior module 1706, machine learning is used in a two-pass behaviour model. The first pass is the dynamic instant by instant as described above. The second pass occurs at the end of each day: a second pass is run with the goal of revisiting decisions made that day, comparing predictions against actual values, and coming up with corrective information for adjusting the machine learning algorithm to improve its future predictions.

Use Cases

The system enables a lower capital expenditure (capex), lower cost of energy storage, as well as providing an option of connecting "floating", or spare, vehicles as batteries in a vehicle-to-microgrid model.

With battery-swapping batteries, a spare number of batteries may be redirected as secondary batteries. The energy stored can be used to serve the site's energy needs. In addition, users with energy remaining in their batteries may want to sell the energy and may have the option to do so. Furthermore, vehicle drivers with remaining energy in the EV battery at the end of the day can have the ability to sell the energy. Finally, vehicle-to-microgrid and battery swapping models enable individuals with depleted batteries to replace them with fully charged ones.

In addition to the above, there is disclosed a method that promotes reduced costs of electricity in addition to reducing the capex of the system. Energy from cheaper energy sources (including solar and wind) can be procured at other locations, but without a guarantee of consumption. As such, the terms of the purchase contract and the economics may not meet the need.

The present disclosure further includes a method to co-ordinate the consumption of energy from the grid in such a way as to preferentially consume all such purchased cheaper energy. All the EV charging stations can be coordinated to consume optimal amounts of renewable energy. Electricity "wheeling" agreements are enabled, in which electricity is guaranteed to be used (and if needed, sold at a given rate to a specific consumer). Therefore, cheap electricity is purchased for EV charging through coordinating EV charging to use all the energy generated.

Module for Dynamic Optimization of the Use of Storage

Once a system is sized and provisioned at a given site, having been optimized for the sizing and capital investment and payback, there is still a significant amount of variability in the amount of renewable energy production, the arrival of EVs and their energy and power requirements, along with other factors (e.g. Weather). This variability provides an opportunity to optimize the behavior of the micro grid system to continually adapt its behavior based on actual conditions and predictions of events for the remainder of a given day.

Examples of behaviors that can be optimized are (a) optimal use of the storage resource and (b) decision to buy from, not buy or if applicable, sell to the grid.

In many cases, it is best to optimize for maximum returns on EV charging, by directing maximum renewable energy (generated or stored), towards EV charging. Based on predictions of renewable energy production, EV arrival time, behavior of micro grid and the cost function of buying, generating or selling power, the system can decide if it is effective to charge, discharge or conserve the energy in the battery.

Figure 18:
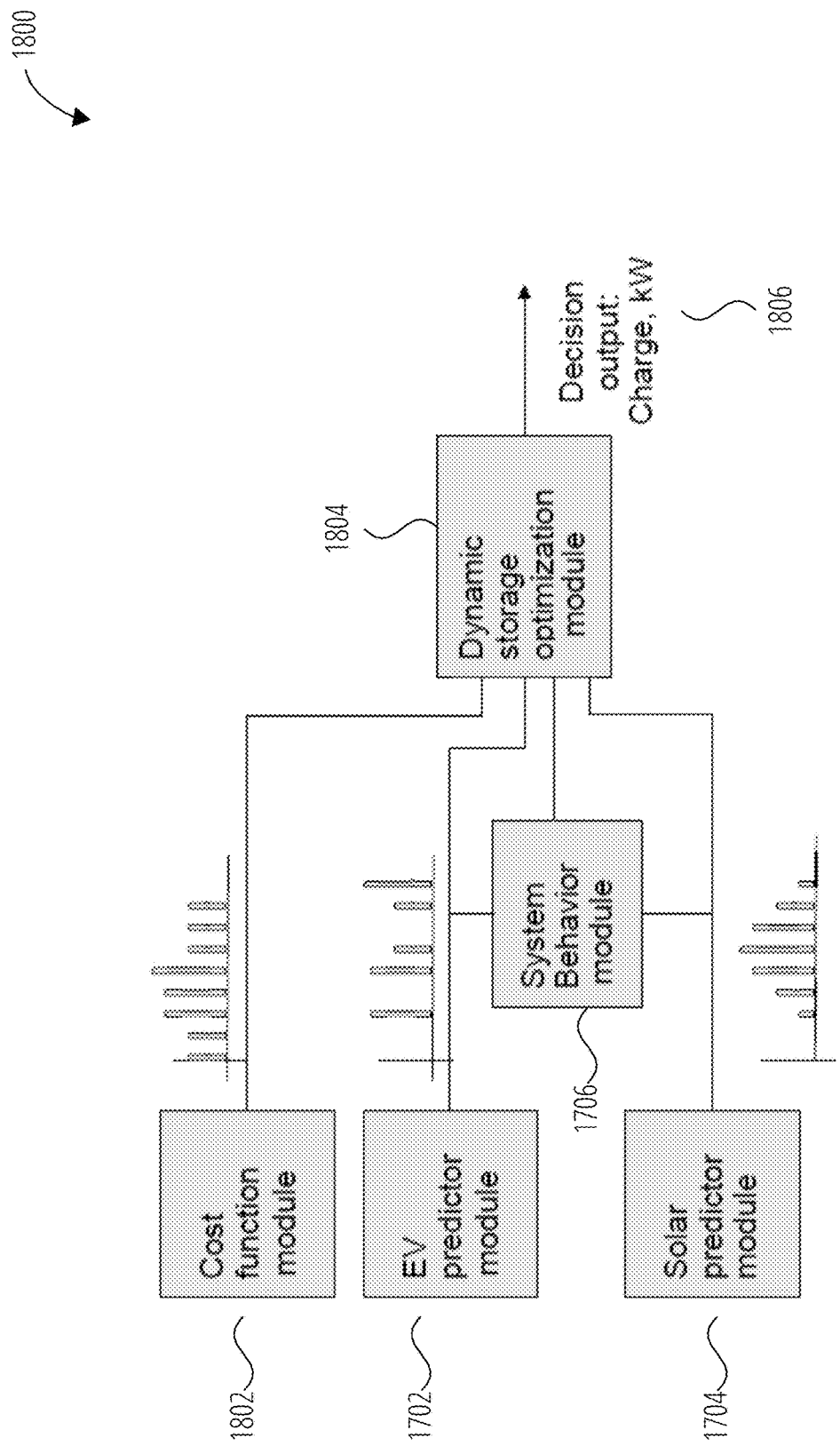
FIG. 18 illustrates a dynamic storage optimization module in accordance with one embodiment.

FIG. 18 illustrates a dynamic storage optimization module 1800 in accordance with one embodiment.

In addition to the solar predictor module 1704, EV predictor module 1702 and system behavior module 1706 described above, a cost function module 1802 is also used by the dynamic storage optimization module 1804 to provide a decision output 1806.

The cost function module 1802 provides values representing the time-based cost of buying electricity and, if applicable, selling and of storage and retrieval for the various sources available to the microgrid. Sources can include renewable sources, utility, generator and battery.

The dynamic storage optimization module 1804 uses the output each of the cost function module 1802, the EV predictor module 1702, the solar predictor module 1704 and the system behavior module 1706 to provide its output which is a decision to charge, hold, or discharge the battery with the main goal of maximizing the use of renewable energy towards EV charging and minimizing the purchase of grid energy towards EV charging.

Module Description and Examples

There are various factors that need to be optimized in the use of renewable energy and microgrids in EV charging. Examples include: maximal delivery of renewable energy into an EV charger; amount of storage capacity that is available or held in reserve for accepting additional renewable energy from the solar PV; best use of the stored energy in the batteries to serve the load at any given instant, considering the opportunity cost of not having it later when a better use opportunity appears; and varying price of purchase of grid electricity to supplement energy from solar power available at any instant.

For example: if it is predicted that on or more EVs will show up for charging later in the evening, then the best use of the storage is to store away the excess solar energy to be delivered to the EVs arriving after the solar day rather than to discharge the battery during the solar day to serve the loads during periods of solar shortfall. Instead, the module will direct the battery to hold from discharging during the day and instead, let the system buy power from the grid for charging during the day. This results in greater battery stored reserve available for the time after solar production has diminished or ended. EVs arriving at this time will get the stored solar energy delivered to them, maximizing the renewable energy delivered into the EV charging.

An example of the opposite kind of behavior is where the arrival of EVs is predicted to be minimal after solar production has diminished or ended. In this case, the module directs the system to discharge the batteries into the EV load at every opportunity when the solar production is insufficient to meet the need. The module can provide this direction until the level of the stored energy in the battery (SoC) is at a point where it is now better to hold sufficient reserves for the EVs predicted to arrive later.

Dynamic Storage Optimization Module.

At regular intervals, the projected end of day renewable energy percentage delivered to EV charging is compared for three different decision possibilities. The decision possibility that projects the maximum value is chosen.

Three candidate decisions that are compared under the circumstances identified by the solar projection model and the EV projection model, taken alongside the cost function model. The effects of these circumstances are reflected by the system behavior model. The net results are translated into a percentage of renewable energy delivered to the EV charger by end of day figure of merit.

The three possibilities are:
1. Draw from the grid only
2. Draw from the battery only
3. Draw a percentage from the grid and the rest from the battery, the ratio suggested by a daily model that takes into consideration the actual decisions already made that day and EV charging events that have already occurred until the current point in time, extended to the end of the day by projections from the EV projection model.

Simulation Example

A simulation program logic was developed based on a Monte Carlo simulation technique for power consumption at a retail outlet in India.

There are four main considerations: solar power generated from the sun; the amount of solar power stored in a battery; the availability of grid power; and the frequency of EVs arriving at the retail outlet, along with the battery capacity of each.

For a retail outlet, sunlight varies during the day and season. Therefore, the quantity solar power generated is not constant throughout a given day, or season. If generated solar power is in excess of the actual consumption/demand of the outlet, it can be stored in a battery for future consumption. In certain parts of India, grid power is occasional and cannot be predicted; grid power is thus also modeled via a random number generator. As summarized in FIG. 2, if solar power, battery power and the grid are not available when an EV arrives for charging, then a generator is put into action to meet the power demand Solar Power Generation Variation of solar intensity throughout a 24-hour period was selected by selecting one of four seasons in India: summer, monsoon (rainy season), autumn and winter. Solar power is maximum during the summer and least during the monsoon season (i.e. Indian tropical rainy season when the sky is mostly cloudy). Each season lasts about 3 months. FIG. 19 illustrates solar illumination values 1900 in accordance with one embodiment. Solar intensity for the four different seasons (summer, autumn, monsoon, winter) per hour over a 24-hour period, is listed, based on seasonal averages. The solar photovoltaic capacity is set to 12.75 kW. It is assumed that the efficiency factor of the photovoltaic converter is 1 (i.e. 100%). The PV capacity and efficiency factor are parameters that can be varied. The last column provides the solar photovoltaic generation (i.e. Solar power) for a given season generated during a given hour interval; it is calculated as follows:

$$\text{Solar PV generation} = \text{solar illumination (for the season)} \times \text{PV capacity} \times \text{efficiency factor}$$

In FIG. 19, the summer season has been selected. Therefore the solar PV generation during hour interval 7-8 is equal to 5%×12.75=0.64 kW. The solar PV generation is calculated for 24-hour time interval, with the sum of 98.19 kW as the total solar PV generation over a 24-hour period during the summer.

Solar PV cells provide direct DC power which can be directly consumed by the equipment within the retail outlet, including EV charging service. If there are no vehicles available for EV charging and basic power demand from the retail outlet is also low, then excess solar PV cells power production is stored in the battery. This provides green captive power and can be used later when power demand increases due to EVs or other retail outlet activities.

EV Occurrences

The arrival and departure of EVs are based on random number generation. The random number generated by the program within a given range, is considered as the numbers of EVs available for charging. For example, the table shown in FIG. 20. indicates that during a 24-hour period, 11 EVs, each with a 5 kW charging capacity arrive at the station, during hours 6-8, 10, 13-15, 17 and 19-21; while 8 EVs, each with a 15 kW charging capacity arrive at the station during hours 7, 10, 12-14, 18-19 and 21. These arrival times and capacities have been generated using a random generator. Since the arrival of EVs for charging is not predictable (i.e. random), the power demand is dynamic and cannot be predicted.

Grid Power

In certain parts of India, grid power is occasional and cannot be predicted; grid power is thus also modeled via a random number generator.

3) The randomness of solar power battery charging and discharging depends on the dynamic power demand situation.

The Excel model works with computer based simulations to almost give near real prediction of model behavior.

Figure 20:
FIG. 20 illustrates a simulation summary in accordance with one embodiment.

FIG. 20 illustrates a simulation summary 2000 in accordance with one embodiment.

The table predicts for one day (24 hours) the "Power demand" vs "Actual power supply" through the microgrid controller.

In FIG. 20, the retail outlet base load values 2002 vary through the day, but does not change substantially from day to day, as such, these are not subject to Monte Carlo simulation. The power demand 2008 is just the sum of the total power required by the EVs and the RO base load. For example, during hour 7, one 5 kW EV car, one 15 kW EV car and 2 kW for the retail outlet are required, for a total of 22 kW. The power supply 2010 is simply the power available from solar energy, as shown in FIG. 19.

The various entities regarding battery power 2012 are computed separately and shown in summary 2000. These are used determined how much grid power is used, by examining the shortfall 2014, which is equal to the direct consumption of solar power minus the consumption of solar power from the battery. If this number is greater than zero, then the grid provides the shortfall; if this number is equal to zero, there is no need for the grid to provide any energy. This is shown by the column grid power 2016. The cumulative power consumed at each hour interval, is shown at column 2018, which is includes the contributions from the grid and solar components. Finally, the cost per hour 2022 is computed from the grid rate (column 2020) and the power demand 2102. In this case, the grid rate is fixed throughout the day.

The various entities regarding battery power 2012 are calculated based on a number of factors, including generation of solar power; excess amount of solar power stored in the battery; and consumption of solar power (direct and stored) by arriving EVs during the 24-hour period.

Figure 21:
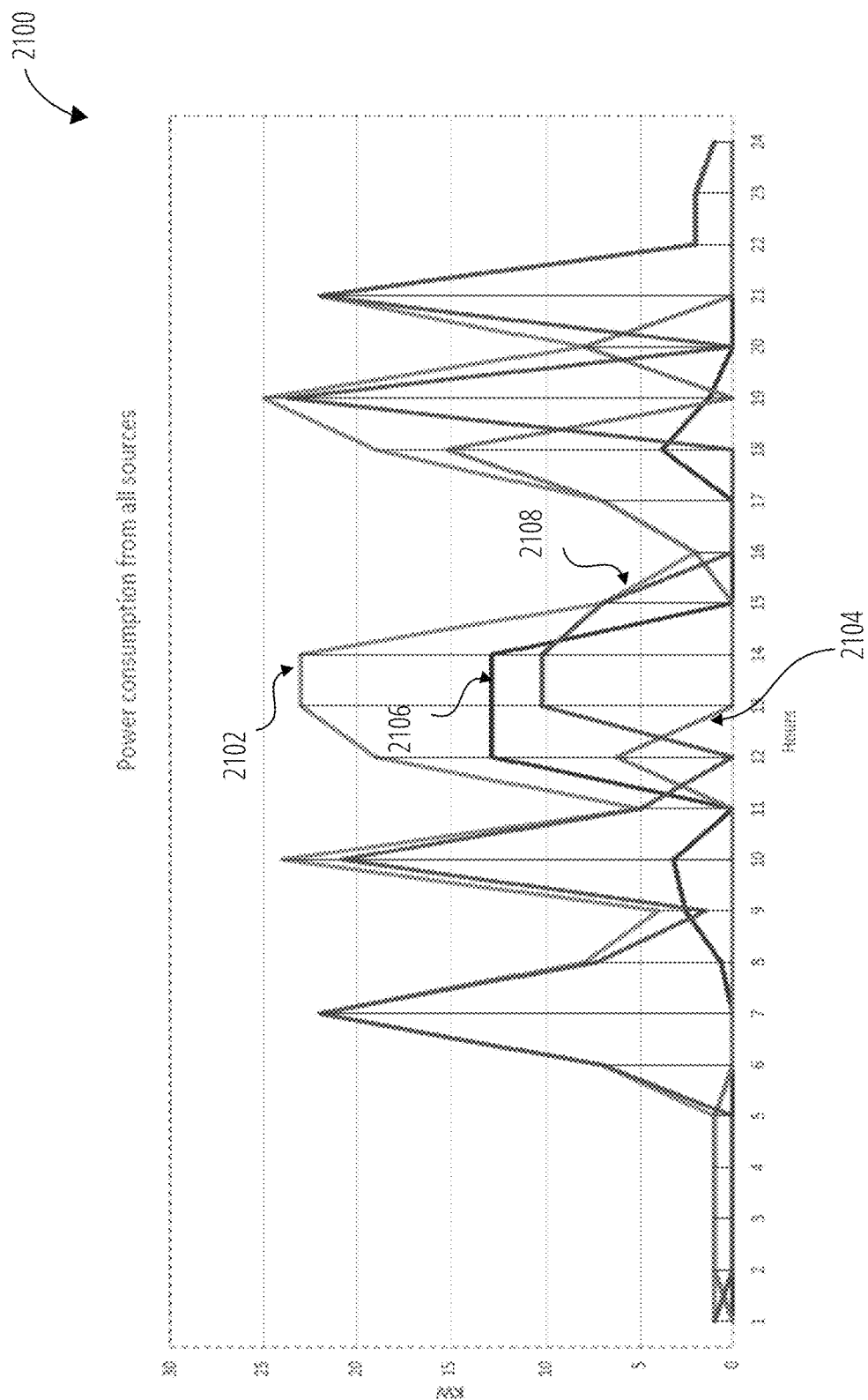
FIG. 21 illustrates power consumption from all sources, based on FIG. 20.

FIG. 21 illustrates power consumption 2100 from all sources, based on summary 2000 shown in FIG. 20. For example, during the hours of 11 to 15, the power demand 2102 is the sum of three sources: the solar power obtained from the battery 2104; the power obtained directly from solar 2106, and the power obtained from the grids 2108. It should be noted that in FIG. 21, contribution from the generator to the total power demand 2102 is not present, since in this simulation example, there was no failure of the other three sources (direct solar, solar from battery and grid).

Figures 22A, 22B:
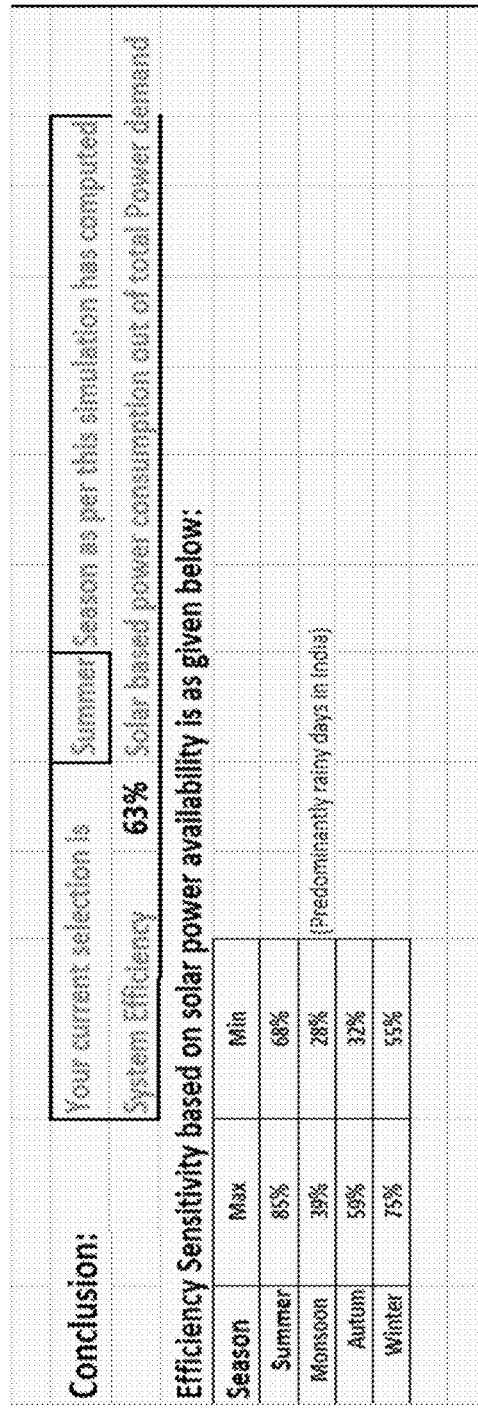
FIG. 22A illustrates power costs in conjunction with FIG. 20
FIG. 22B illustrates system efficiency in conjunction with FIG. 20.

FIG. 22A illustrates power costs in conjunction with FIG. 20. The only random value is the grid, as explained above. The grid cost varies from simulation to simulation.

Finally, FIG. 22B provides a system efficiency of the simulation summary 2000, when summer season has been selected. In this case, the efficiency is 63%, based on the solar-based power consumption out of the total power demand.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A microgrid system comprising a microgrid controller, a primary dynamic storage module, a secondary storage guidance module, a solar predictor module, system behavior module and an EV predictor module;
   the microgrid controller configured to receive a plurality of input energy sources, the input energy sources comprise a grid source; a generator source; a first battery, a second battery and one or more renewable energy sources;
   wherein the microgrid controller is configured to direct output power from the grid source, the generator source and the one or more renewable energy sources to: the battery for charging the battery;
   wherein the microgrid controller is configured to direct power to a site load and an EV charging service by a blend of the one or more renewable energy sources, the first battery, the grid source, and the generator source;
   wherein the primary dynamic storage module is configured to determine when and from which of the plurality of input energy sources is used to charge the first battery, using as input: the EV predictor module based on EV charging daily load patterns and historical EV daily arrival patterns to preferentially consume energy from a cheapest source possible of the plurality of input energy sources;
   wherein the microgrid controller is configured to provide guidance on when the second battery is connected as input based on the primary dynamic storage module to increase capacity;
   wherein the second battery is detachable from the microgrid system;
   wherein the secondary storage guidance module is configured to predict second battery specifics selected from at least one of:
      how many times a day to use the second battery;
      a time of day when to use the second battery; and
      a storage capacity of the second battery; and
   wherein the secondary storage guidance module using as input:
      the EV predictor module output;
      the solar predictor module output based on one or more of a location-based historical photovoltaic model, local weather prediction, short-term historical solar production data, historical geographic records for solar illumination, local climatic conditions, seasonal adjustments, and site specific performance history; and
      the system behavior module output based on a historical effectiveness of storage at a given site for a given system sizing; site load patterns; and EV charging load patterns.

2. The microgrid system of claim 1, wherein the microgrid controller is configured to direct excess power provided by the grid source; the generator source; and the one or more renewable energy sources to charge the battery.

3. The microgrid system of claim 1, wherein the microgrid controller is configured to prioritize the one or more renewable energy sources for EV charging and powering the site load.

4. The microgrid system of claim 1, wherein microgrid controller is configured to direct the battery power to the EV charging service only when there is a shortfall in power requirement of the one or more renewable energy sources and a state of charge of the battery is above a cyclic low threshold.

5. The microgrid system of claim 1, further comprising a database storing:
   one or more source data structures, each source data structure associated with a respective input energy source, each data structure comprising information about the respective input energy source, the information comprising: one or more time intervals during which the respective input energy source provides energy to the battery; and an amount of power provided by the respective input energy source to the battery during each time interval; and
   a blend ratio buffer, the blend ratio buffer comprising: a state of charge of the battery and a split factor of each input energy source during each time interval.

6. The microgrid system of claim 5, wherein a billing module is used to determine billing for an episode of charging an electrical vehicle, the billing module based on:
   billing information for each input energy source;
   a direct contribution of each input energy source towards the episode;
   a blended contribution of each input energy source towards the episode, the blended contribution based on the blend ratio buffer; and
   one or more parameters of the battery.

7. The microgrid system of claim 6, wherein the billing is determined after the episode is complete, or the billing is continually evaluated during the episode.

8. The microgrid system of claim 1, wherein the second battery is embedded as a main battery in an electric vehicle.

9. The microgrid system of claim 1, wherein:
   the EV predictor module provides a first prediction, for a given day, of at least one of: one or more EV occurrences and EV power requirements for each occurrence;
   the solar predictor module provides a second prediction for the given day, of solar illumination; and
   the system behavior module provides a third prediction, for the given day, of at least one of:
      power consumption of the site; and
      occurrences of a change of the input energy sources occurs.

10. The microgrid system of claim 1, wherein at least one of the EV predictor module, the solar predictor module and the system behavior module is a machine-learning based module.

11. A method of powering a site load and an electric vehicle (EV) charging service, the method comprising:
providing as input to a microgrid controller of a microgrid, a plurality of input energy sources selected from a grid source; a generator source; a first battery and one or more renewable energy sources;
providing as output by the microgrid controller: the battery, the site load and the EV charging service;
directing output power with the microgrid controller at selected times from the grid source, the generator source and the one or more renewable energy sources to the first battery for charging the battery;
directing output power with the microgrid controller at selected times to the site load and the EV charging service by a blend of the one or more renewable energy sources, the first battery, the grid source, and the generator source;
determining with a primary dynamic storage module of the microgrid controller when and from which of the plurality of input energy sources is used to charge the first battery, using as input an EV predictor module based on EV charging daily load patterns, and historical EV daily arrival patterns to preferentially consume energy from a cheapest source possible of the plurality of input energy sources; and
predicting, by a secondary storage guidance module, one or more second battery specifics selected from at least one of:
how many times a day to use the second battery;
a time of day when to use the second battery; and
a storage capacity of the second battery;
wherein the secondary storage guidance module using as input the output from at least one of:
the EV predictor module;
a solar predictor module based on one or more of a location-based historical photovoltaic model, local weather prediction, short-term historical solar production data, historical geographic records for solar illumination, local climatic conditions, seasonal adjustments, and site-specific performance history; and
a system behavior module based on a historical effectiveness of storage at a given site for a given system sizing; site load patterns; and EV charging load patterns.

12. The method of claim 11, further comprising storing in a database:
one or more source data structures, each source data structure associated with a respective input energy source, each data structure comprising information about the respective input energy source, the information comprising: one or time intervals during which the respective input energy source provides energy to the battery; and an amount of power provided by the respective input energy source to the battery during each time interval; and
a blend ratio buffer, the blend ratio buffer comprising: a state of charge of the battery and a split factor of each input energy source during each time interval.

13. The method of claim 11, wherein the primary dynamic storage module also uses as input:
a solar predictor module based on one or more of a location-based historical photovoltaic model, local weather prediction, short-term historical solar production data, historical geographic records for solar illumination, local climatic conditions, seasonal adjustments, and site specific performance history;
a system behavior module based on a historical effectiveness of storage at a given site for a given system sizing; site load patterns; and EV charging load patterns; and
a cost function module providing values representing a time-based cost of buying electricity and of selling, storage and retrieval for the input energy sources.

14. A microgrid system comprising a microgrid controller, a primary dynamic storage module, a solar predictor module, system behavior module, an EV predictor module and a cost function module;
the microgrid controller configured to receive a plurality of input energy sources, the input energy sources comprise a grid source; a generator source; a first battery, a second battery and one or more renewable energy sources;
wherein the microgrid controller is configured to direct output power from the grid source, the generator source and the one or more renewable energy sources to: the battery for charging the battery;
wherein the microgrid controller is configured to direct power to a site load and an EV charging service by a blend of the one or more renewable energy sources, the first battery, the grid source, and the generator source;
wherein the primary dynamic storage module is configured to determine when and from which of the plurality of input energy sources is used to charge the first battery, using as input: the EV predictor module based on EV charging daily load patterns and historical EV daily arrival patterns to preferentially consume energy from a cheapest source possible of the plurality of input energy sources;
wherein the microgrid controller is configured to provide guidance on when the second battery is connected as input based on the primary dynamic storage module to increase capacity;
wherein the second battery is detachable from the microgrid system; and
wherein the primary dynamic storage optimization module is configured to use as input the output from at least one of:
the EV predictor module;
the solar predictor module based on one or more of a location-based historical photovoltaic model, local weather prediction, short-term historical solar production data, historical geographic records for solar illumination, local climatic conditions, seasonal adjustments, and site specific performance history;
the system behavior module based on a historical effectiveness of storage at a given site for a given system sizing; site load patterns; and EV charging load patterns; and
the cost function module providing values representing a time-based cost of buying electricity and of selling, storage and retrieval for the input energy sources.

15. The microgrid system of claim 14, wherein:
the EV predictor module provides a first prediction, for a given day, of at least one of: one or more EV occurrences and EV power requirements for each occurrence;
the solar predictor module provides a second prediction for the given day, of solar illumination; and the system behavior module provides a third prediction, for the given day, of at least one of:
one or more energy shortfalls;
power consumption of the site; and
occurrences of a change of the input energy sources occurs; and the cost function module provides information about at least one of:
time-based electricity rates;
selling rates for each of the input energy sources;
storage rates for each of the input energy sources; and
retrieval rates for each of the input energy sources.

16. The microgrid system of claim 14, wherein at least one of the EV predictor module, the solar predictor module and the system behavior module is a machine-learning based module.

17. The microgrid system of claim 14, wherein the microgrid controller is configured to direct excess power provided by the grid source; the generator source; and the one or more renewable energy sources to charge the battery.

18. The microgrid system of claim 14, wherein the microgrid controller is configured to prioritize the one or more renewable energy sources for EV charging and powering the site load.

19. The microgrid system of claim 14, wherein microgrid controller is configured to direct the battery power to the EV charging service only when there is a shortfall in power requirement of the one or more renewable energy sources and a state of charge of the battery is above a cyclic low threshold.

20. The microgrid system of claim 14, further comprising a database storing:
one or more source data structures, each source data structure associated with a respective input energy source, each data structure comprising information about the respective input energy source, the information comprising: one or more time intervals during which the respective input energy source provides energy to the battery; and an amount of power provided by the respective input energy source to the battery during each time interval; and
a blend ratio buffer, the blend ratio buffer comprising: a state of charge of the battery and a split factor of each input energy source during each time interval.

21. The microgrid system of claim 20, wherein a billing module is used to determine billing for an episode of charging an electrical vehicle, the billing module based on:
billing information for each input energy source;
a direct contribution of each input energy source towards the episode;
a blended contribution of each input energy source towards the episode, the blended contribution based on the blend ratio buffer; and
one or more parameters of the battery.

22. The microgrid system of claim 21, wherein the billing is determined after the episode is complete, or the billing is continually evaluated during the episode.

23. The microgrid system of claim 14, wherein the second battery is embedded as a main battery in an electric vehicle.

* * * * *